US012183197B2

(12) United States Patent
Drayna et al.

(10) Patent No.: US 12,183,197 B2
(45) Date of Patent: Dec. 31, 2024

(54) FREE LOCK DETECTION OF A MICROMOBILITY TRANSIT VEHICLE SYSTEMS AND METHODS

(71) Applicant: Lyft, Inc., San Francisco, CA (US)

(72) Inventors: Garrett Korda Drayna, San Carlos, CA (US); Gary Shambat, San Francisco, CA (US); Jacqueline Benesch Tandler, New York, NY (US); Griffin Samuel Valentine Thomson, San Francisco, CA (US); Jens Paul Windau, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/536,045

(22) Filed: Dec. 11, 2023

(65) Prior Publication Data

US 2024/0119835 A1 Apr. 11, 2024

Related U.S. Application Data

(63) Continuation of application No. 17/024,423, filed on Sep. 17, 2020, now Pat. No. 11,842,641, which is a continuation of application No. 16/835,796, filed on Mar. 31, 2020, now Pat. No. 10,783,784.

(51) Int. Cl.

| | |
|---|---|
| ***G08G 1/123*** | (2006.01) |
| ***G07C 5/00*** | (2006.01) |
| ***G07C 5/08*** | (2006.01) |

(52) U.S. Cl.
CPC ............ *G08G 1/123* (2013.01); *G07C 5/008* (2013.01); *G07C 5/085* (2013.01)

(58) Field of Classification Search
CPC ........ G08G 1/123; G08G 1/205; G07C 5/008; G07C 5/085
USPC .............................................. 340/932.2, 432
See application file for complete search history.

(56) References Cited

U.S. PATENT DOCUMENTS

| | | | | |
|---|---|---|---|---|
| 9,932,759 | B2 * | 4/2018 | Mohamed | E05B 45/06 |
| 10,514,468 | B2 * | 12/2019 | Xia | B62H 5/00 |

* cited by examiner

*Primary Examiner* — Eric Blount
(74) *Attorney, Agent, or Firm* — Baker Botts L.L.P.

(57) ABSTRACT

Techniques are disclosed for systems and methods associated with free lock detection of a micromobility vehicle. Data from one or more sensors of the micromobility vehicle may be received and compared to a threshold stored or determined for the micromobility vehicle. Based on the comparing, an indication of free locking the micromobility vehicle may be determined and one or more notifications of the indication may be generated and sent for display on a mobile device. A parking condition of the micromobility vehicle may also be determined, such as utilizing image data of the micromobility vehicle. The image data may be analyzed to determine whether the micromobility vehicle is parked within a designated parking area distinguished through distinct coloring, patterns, signs, placards, markers, or images.

20 Claims, 17 Drawing Sheets

FREE LOCK DETECTION OF A MICROMOBILITY TRANSIT VEHICLE SYSTEMS AND METHODS

CROSS-REFERENCE TO RELATED APPLICATION

This application is a continuation of U.S. application Ser. No. 16/835,796, filed Mar. 31, 2020, which is hereby incorporated by reference in its entirety.

TECHNICAL FIELD

One or more embodiments of the present disclosure relate generally to micromobility transit vehicles and more particularly, for example, to systems and methods for detecting a free lock condition of a micromobility transit vehicle.

BACKGROUND

Riders of a shared micromobility vehicle (e.g., scooter, sit-scooter, bicycle, etc.) do not always follow proper rules of the road. Whether the rules are internal policies or local regulations, riders often violate riding and parking procedures, knowingly or unknowingly. Some examples of riding or parking violations include riding the micromobility vehicle improperly (e.g., on a sidewalk, not on a sidewalk, outside of a dedicated bike lane, etc., as determined by local regulations or restrictions set by the entity managing the use of the micromobility vehicle), parking the micromobility vehicle improperly (e.g., blocking a driveway or entrance to a building, on private property, adjacent to or within a crosswalk, within dedicated landscaped areas, etc., as determined by jurisdiction regulations or restrictions set by the entity managing the use of the micromobility vehicle), or locking the micromobility improperly (e.g., to a tree, to a public bench, to another vehicle, to an improper structure, to itself, or not at all, among others, as determined by jurisdiction regulations or restrictions set by the entity managing the use of the micromobility vehicle). These and other riding and parking violations are damaging to a ridesharing company. For example, such violations can lead to numerous and expensive fines imposed on the ridesharing company from a local municipality, damage the relationships between the ridesharing company and local municipalities, and destroy public confidence and perception of the ridesharing company and industry.

Therefore, there is a need in the art for systems and methods for detecting improper parking and riding behavior that addresses the deficiencies noted above, other deficiencies known in the industry, or at least offers an alternative to current techniques. For example, improvements are needed to better detect a free lock condition of a micromobility vehicle at end of the ride.

SUMMARY

Techniques are disclosed for systems and methods associated with free lock detection of a micromobility transit vehicle. In accordance with one or more embodiments, a free lock detection system for a micromobility transit vehicle is provided. The free lock detection system may include a hardware processor and a non-transitory memory coupled to the hardware processor and having instructions stored therein, which when executed by the processor, cause the system to perform operations. The operations may include receiving data from one or more sensors of the micromobility transit vehicle, determining a threshold based on the micromobility transit vehicle, comparing the data to the threshold, determining an indication of free locking the micromobility transit vehicle based on the comparing, and generating and sending one or more notifications of the indication for display on a mobile device.

Optionally, the operations may include determining a parking condition of the micromobility transit vehicle utilizing image data of the micromobility transit vehicle. Determining the parking condition may include analyzing the image data to determine whether the micromobility transit vehicle is parked within an area with distinct coloring, texture, or patterns, within an area outlined with distinct coloring, texture, or patterns, or within or near an area identified by an approved parking sign. The operations may include generating and sending one or more notifications of the parking condition for display on the mobile device.

Optionally, a micromobility transit vehicle may include the free lock detection system and an accelerometer. The free lock detection system may receive vibration data from the accelerometer, compare the vibration data to at least one of a threshold frequency spectrum stored for the micromobility transit vehicle or one or more time-domain features stored from the micromobility transit vehicle, and determine the indication of free locking the micromobility transit vehicle based on the comparison.

Optionally, a micromobility transit vehicle may include the free lock detection system and an inertial measurement unit (IMU). The free lock detection system may receive a roll angle from the IMU, compare the roll angle to a threshold roll angle stored for the micromobility transit vehicle, and determine the indication of free locking the micromobility transit vehicle based on the comparison.

In accordance with one or more embodiments, a method for determining a free lock condition of a micromobility transit vehicle may include receiving data from one or more sensors of the micromobility transit vehicle, comparing the data to a threshold stored for the micromobility transit vehicle, determining an indication of free locking the micromobility transit vehicle based on the comparing, and generating and sending one or more notifications of the indication for display on a mobile device.

Optionally, a roll angle from an inertial measurement unit (IMU) of the micromobility transit vehicle may be received. The roll angle may be compared to a threshold roll angle stored for the micromobility transit vehicle. A ground angle may be determined based on a location of the micromobility transit vehicle. The threshold roll angle may be adjusted based on the ground angle. The threshold roll angle stored for the micromobility transit vehicle may be based on a kickstand length of the micromobility transit vehicle. Vibration data from the IMU may be received. The vibration data may be compared to at least one of a threshold frequency spectrum stored for the micromobility transit vehicle or one or more time-domain features stored for the micromobility transit vehicle. Data from a proximity sensor of the micromobility transit vehicle may be received. The proximity sensor may be configured to detect whether a security device of the micromobility transit vehicle is secured to an object.

Optionally, a first notification of a first notification type may be generated and sent upon or after determining a first indication of free locking the micromobility transit vehicle. A second notification type may be generated and sent upon or after determining a second indication of free locking the micromobility transit vehicle.

In accordance with one or more embodiments, a method for determining a free lock condition of a micromobility transit vehicle may include detecting an end-of-ride of the micromobility transit vehicle, receiving data from one or more sensors of the micromobility transit vehicle upon or after the detecting, comparing the data to a threshold associated with a position of the micromobility transit vehicle, determining an indication of free locking the micromobility transit vehicle based on the comparing, and generating and sending one or more notifications of the indication for display on a mobile device.

Optionally, the method may include determining a parking condition of the micromobility transit vehicle utilizing image data of the micromobility transit vehicle. The parking condition may be determined by analyzing the image data to determine whether the micromobility transit vehicle is parked within an area with distinct coloring, texture, or patterns, within an area outlined with distinct coloring, texture, or patterns, or within or near an area identified by an approved parking sign. The parking condition may be determined by analyzing the image data to determine if an end-of-ride image of the micromobility transit vehicle is valid and complete and includes a portion of a picture of the micromobility transit vehicle more than or equal to a threshold amount. Analyzing the image data may include classifying a parking surface and a contextual location of the parking condition of the micromobility transit vehicle. One or more notifications of the parking condition may be generated and sent for display on the mobile device.

Optionally, a roll angle from an inertial measurement unit of the micromobility transit vehicle may be received. The roll angle may be compared to a threshold roll angle stored for the micromobility transit vehicle.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
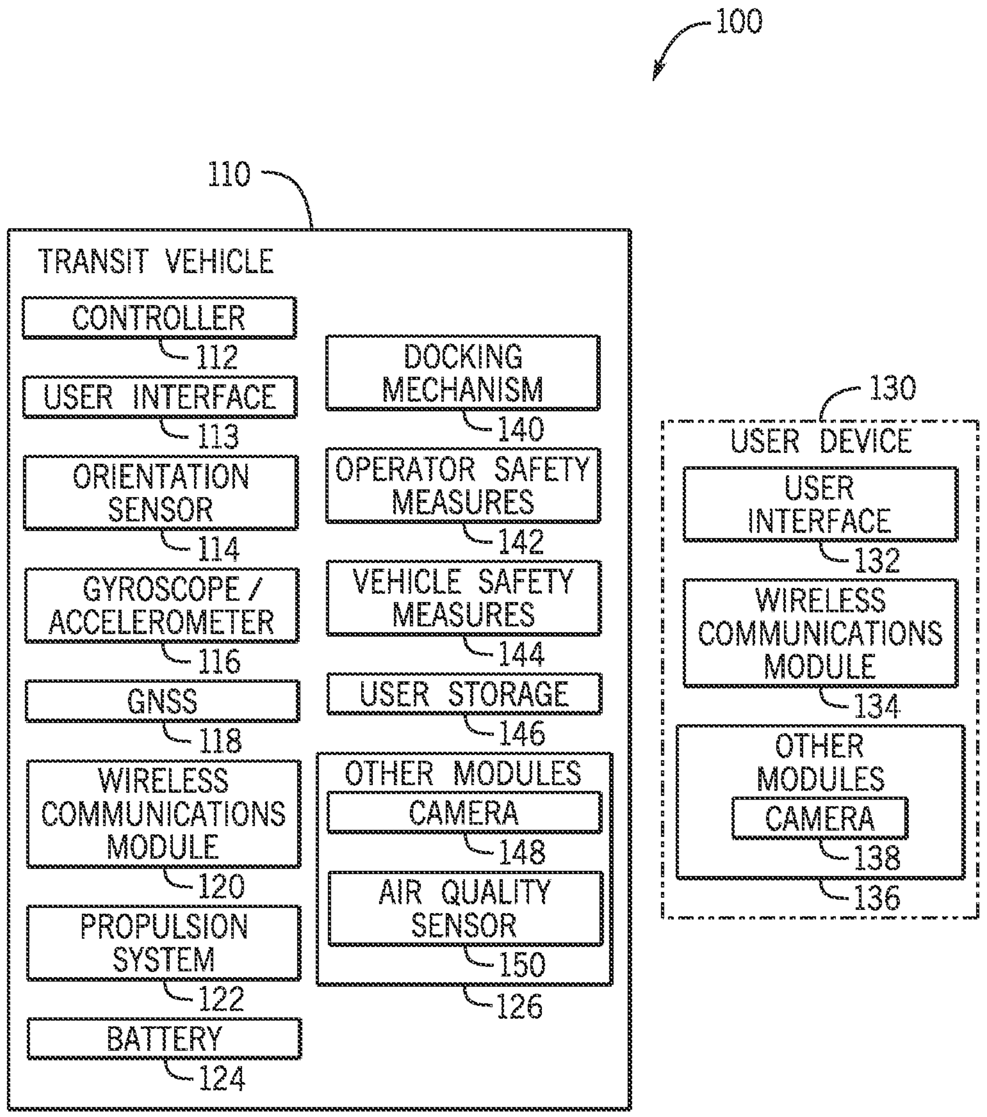
FIG. 1 illustrates a block diagram of a portion of a dynamic transportation matching system including a transit vehicle in accordance with an embodiment of the disclosure.

In accordance with various embodiments of the present disclosure, micromobility transit vehicles (e.g., kick scooters, sit-scooters, bicycles, etc.) benefit from systems and methods that detect improper parking and riding behavior. For example, using one or more sensors, a system can determine whether the micromobility transit vehicle is in a free lock condition. As described herein, “free lock,” “free locked,” or “free locking” (or any other term to describe a free lock condition) refers to when the micromobility transit vehicle is not locked to proper infrastructure (e.g., a pole, bicycle rack, etc.), but is instead locked to itself. In some embodiments, the system can detect a free lock condition using roll angle data of the micromobility transit vehicle, such as obtained from an inertial measurement unit (IMU) or other sensor(s). For example, a free locked micromobility transit vehicle may be angled a certain degree to lean the vehicle on its stand, as described below. In some embodiments, the system can detect a free lock condition using accelerometer data of the micromobility transit vehicle, such as obtained from the IMU or an external accelerometer. For instance, a free locked micromobility transit vehicle may take less time to enter a locked condition and with a smaller accelerometer data frequency spectrum compared to a properly locked vehicle, as detailed below.

In addition, a system may include virtual station detection to determine whether the micromobility transit vehicle is parked properly. For instance, the system may utilize visual or wireless signals/data to detect placement of the micromobility transit vehicle when parked. In embodiments utilizing visual data, the system can detect, using camera or image detection algorithms, whether the micromobility transit vehicle is parked within an approved or designated area set by jurisdiction regulations or by the entity managing use of the micromobility transit vehicle, such as an area with distinct coloring and/or patterns, within an area outlined with distinct coloring and/or patterns, within or near an area adjacent to a dedicated parking sign, within or near an area adjacent to a sign with an ArUco marker, or any combination thereof. In embodiments utilizing wireless signals or data, the system can detect whether the micromobility transit vehicle is properly parked using WiFi, Bluetooth, ultra-wide-band (UWB), radio-frequency identification (RFID), near-field communication (NFC), and/or ultrasound signals, among others. More specifically, a WiFi, Bluetooth, UWB, RFID, NFC, or ultrasound module/receiver may be placed at or near a dedicated parking area, with the micromobility transit vehicle configured to communicate with the modules or receivers to determine placement of the vehicle relative to the dedicated parking area. The dedicated parking area may be an approved or authorized area such that the system may determine when the micromobility transit vehicle is properly parked, or the dedicated parking area may be an unapproved or unauthorized area (e.g., where micromobility transit vehicles are typically parked) such that the system may determine when the micromobility transit vehicle is improperly parked.

Additionally, a system may utilize end-of-ride images taken by the rider to determine whether the micromobility transit vehicle is parked properly. For example, using camera or image detection algorithms, the system can determine whether the end-of-ride image taken by the rider is sufficient and where the micromobility transit vehicle is parked. The end-of-ride analysis may include the following steps: (1) pre-filter image validity check (e.g., Is the image valid and complete?); (2) scooter identification (e.g., Is scooter completely in image?); (3) parking surface classification (e.g., Is the scooter parked on the sidewalk, within a dedicated landscape zone, or within a dedicated parking zone?); and (4) contextual classification (e.g., Is the scooter parked close to a wall, curb, pole, or bike rack? Is the scooter locked to a public bench, a stop sign, a tree, or other improper structure?).

In various embodiments, a system may educate and/or enforce proper rider behavior. For example, if the system detects that the micromobility transit vehicle is improperly locked or parked, the system may generate and send one or more notifications, the one or more notifications providing various levels of intervention. For instance, a push notification with a gentle reminder of proper parking/locking procedures may be generated and sent upon or after detection of a first parking or locking violation, an email with a stem reminder of proper parking/locking procedures may be generated and sent upon or after detection of a second parking or locking violation, a request may be generated and sent requesting or requiring an end-of-ride photo be taken before a ride can be ended upon or after detection of a third parking or locking violation, and a fine may be generated and sent upon or after detection of a fourth parking or locking violation, among others. The enforcement levels may also be modified based on different factors, such as the seriousness of the parking or locking violation and the frequency of the violations. The one or more notifications may be generated and sent for display on a user interface and/or a mobile device. The user interface may be part of the micromobility transit vehicle. The mobile device may be a smartphone, tablet, or other mobile computing and/or communications device.

As described herein, "operator," "user," and "rider" may be used interchangeably, with each term referring to a person or entity that operates, uses, or rides the micromobility transit vehicle. Thus, the operator, user, or rider may be the same person or entity. In some embodiments, "operator," "user," and "rider" may refer to different persons or entities, depending on context and application.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for rental and use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and user and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
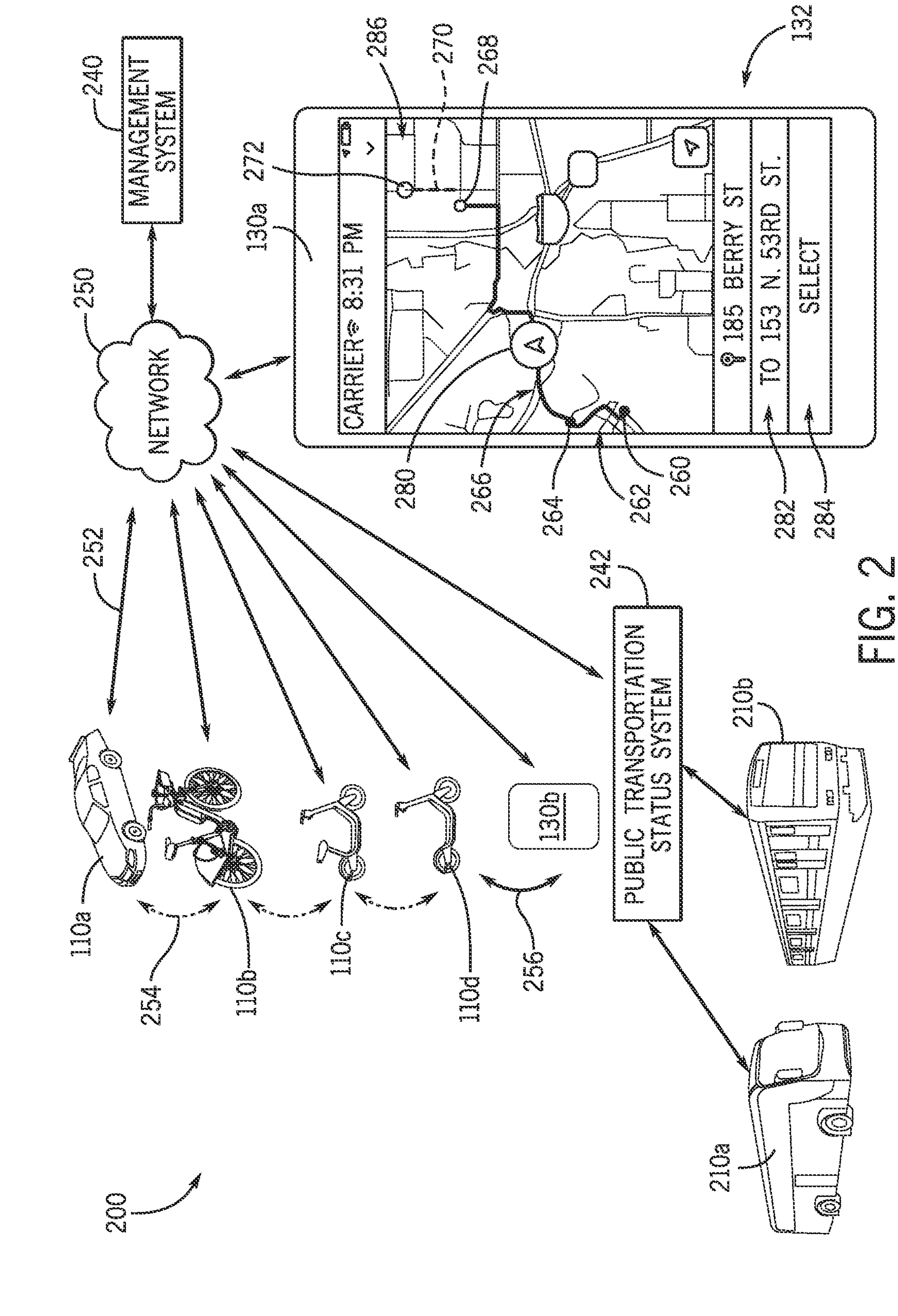
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110*a-d* and user devices 130*a-b* over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210*a*, trains 210*b*, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130*a* may receive an input with a request for transportation with one or more transit vehicles 110*a-d* and/or public transportation vehicles 210*a-b*. For example, the transportation request may be a request to use (e.g., hire or rent) one of transit vehicles 110*a-d*. The transportation request may be transmitted to management system 240 over WAN 250, allowing management system 240 to poll status of transit vehicles 110*a-d* and to select one of transit vehicles 110*a-d* to fulfill the transportation request; receiving a fulfillment notice from management system 240 and/or from the selected transit vehicle, and receiving navigation instructions to proceed to or otherwise meet with the selected transit vehicle. A similar process may occur using user device 130*b*, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110*a-d*, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110*a-d*, as described herein.

User device 130*a* in FIG. 2 includes a display of user interface 132 that shows a planned route for a user attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210*a* or 210*b*), and a micromobility route 270 (e.g., using one or more of micromobility transit vehicles 110*b*, 110*c*, or 110*d*) from bus stop 268 to destination 272. Also shown rendered by user interface 132 are a present location indicator 280 (indicating a present absolute position of user device 130*a* on street map 286), a navigation destination selector/indicator 282 (e.g., configured to allow a user to input a desired navigation destination), and a notice window 284 (e.g., used to render vehicle status data or other information, including user notices and/or alerts, as described herein). For example, a user may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a user (e.g., initially and/or while traversing a particular planned route), and a user may select or make changes to such a route through manipulation of user device 130*a*, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
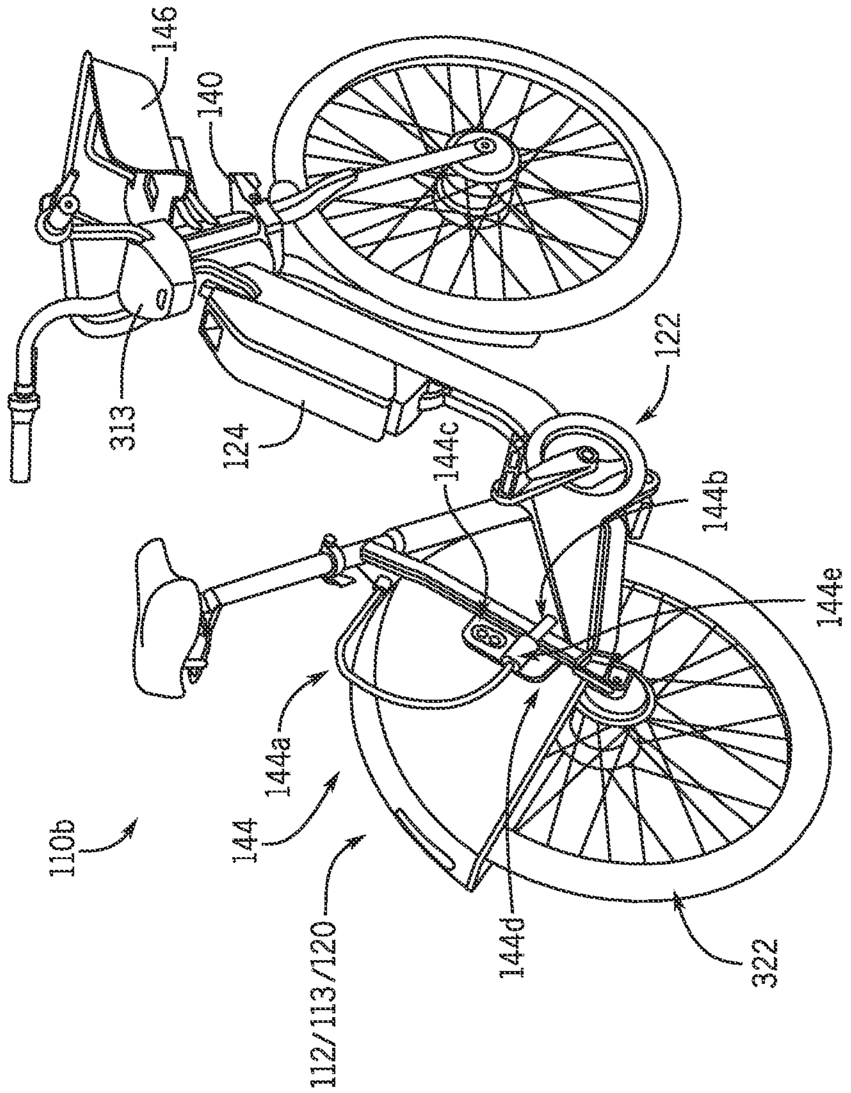
FIGS. 3A-C illustrate diagrams of micromobility transit vehicles for use in a dynamic transportation matching system in accordance with an embodiment of the disclosure.
Figure 3B:
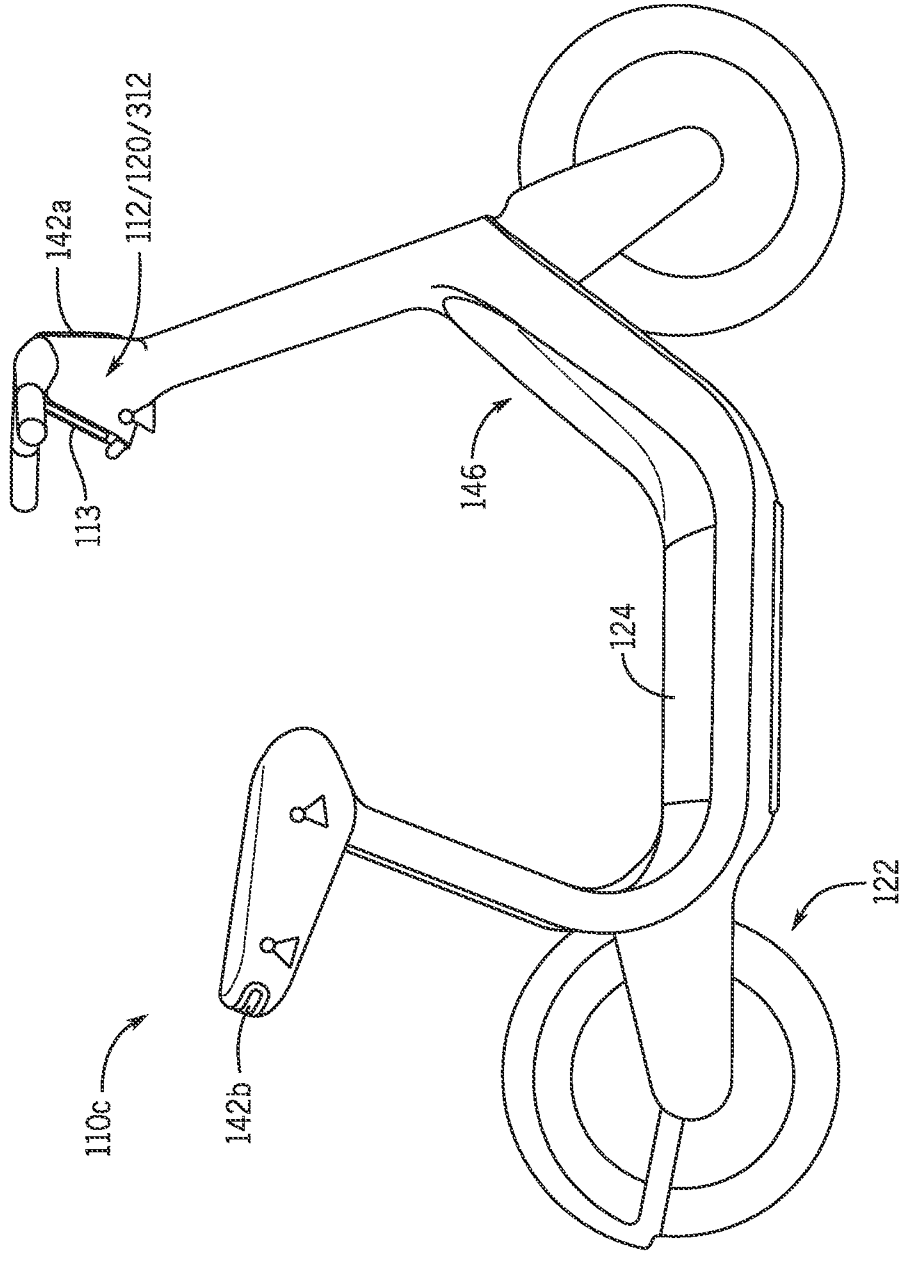
Figure 3C:
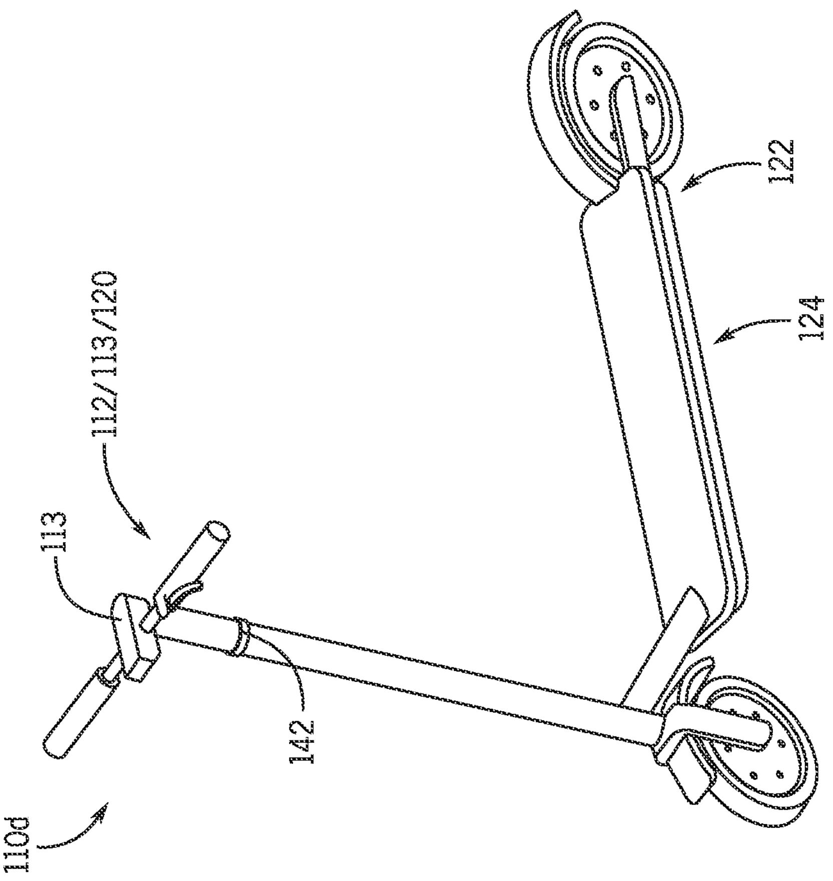

FIGS. 3A, 3B, and 3C illustrate respective diagrams of micromobility transit vehicles 110*b*, 110*c*, and 110*d*, which may be integrated network systems in accordance with an embodiment of the disclosure. For example, transit vehicle 110*b* of FIG. 3A may correspond to a motorized bicycle integrated with the various elements of system 100 and may be configured to participate in dynamic transportation matching system 200 of FIG. 2. As shown, transit vehicle 110*b* includes controller/user interface/wireless communications module 112/113/120 (e.g., integrated with a rear fender of transit vehicle 110*b*), propulsion system 122 configured to provide motive power to at least one of the wheels (e.g., a rear wheel 322) of transit vehicle 110*b*, battery 124 for powering propulsion system 122 and/or other elements of transit vehicle 110*b*, docking mechanism 140 (e.g., a spade lock assembly) for docking transit vehicle 110*b* at a docking station, user storage 146 implemented as a handlebar basket, and vehicle security device (e.g., an embodiment of vehicle security device 144 of FIG. 1), which may incorporate one or more of a locking cable 144*a*, a pin 144*b* coupled to a free end of locking cable 144*a*, a pin latch/insertion point 144*c*, a frame mount 144*d*, and a cable/pin holster 144*e*, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110*b*, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize transit vehicle 110*b* by default, thereby requiring a user to transmit a request to management system 240 (e.g., via user device 130) to reserve transit vehicle 110*b* before attempting to use transit vehicle 110*b*. The request may identify transit vehicle 110*b* based on an identifier (e.g., a QR code, a barcode, a serial number, etc.) presented on transit vehicle 110*b* (e.g., such as by user interface 113 on a rear fender of transit vehicle 110*b*). Once the request is approved, management system 240 may transmit an unlock signal to transit vehicle 110*b* (e.g., via network 250). Upon receiving the unlock signal, transit vehicle 110*b* (e.g., controller 112 of transit vehicle 110*b*) may release vehicle security device 144 and unlock rear wheel 322 of transit vehicle 110*b*.

Transit vehicle 110*c* of FIG. 3B may correspond to a motorized sit-scooter integrated with the various elements of system 100 and may be configured to participate in dynamic transportation matching system 200 of FIG. 2. As shown in FIG. 3B, transit vehicle 110*c* includes many of the same elements as those discussed with respect to transit vehicle 110*b* of FIG. 3A. For example, transit vehicle 110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of headlights, programmable light strips, and/or reflective strips.

Transit vehicle 110*d* of FIG. 3C may correspond to a motorized stand or kick scooter integrated with the various elements of system 100 and may be configured to participate in dynamic transportation matching system 200 of FIG. 2. As shown in FIG. 3C, transit vehicle 110*d* includes many of the same elements as those discussed with respect to transit vehicle 110*b* of FIG. 3A. For example, transit vehicle 110*d* may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
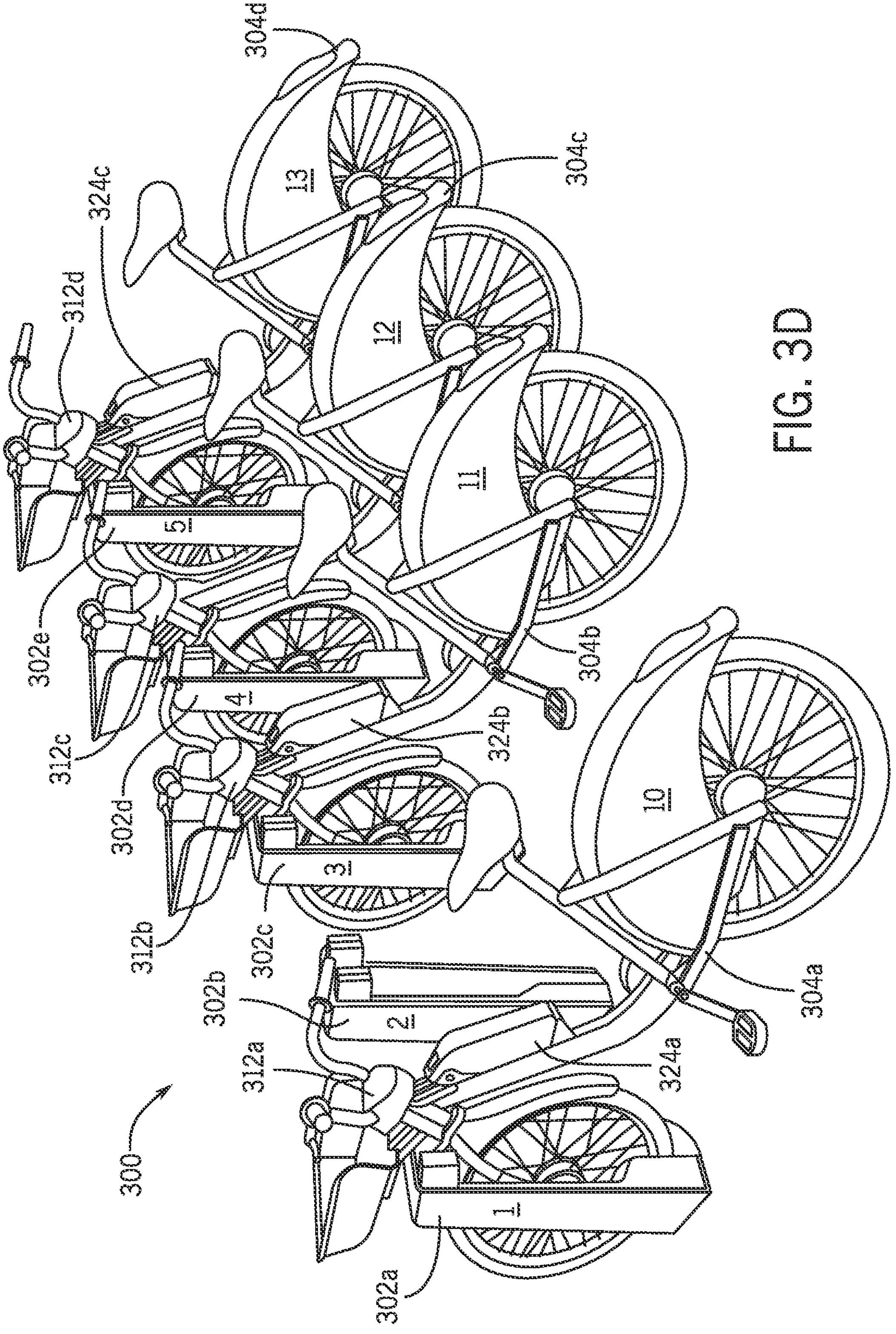
FIG. 3D illustrates a diagram of a docking station for docking micromobility transit vehicles in accordance with an embodiment of the disclosure.

FIG. 3D illustrates a docking station 300 for docking transit vehicles (e.g., transit vehicles 110*c*, 110*e*, and 110*g*, etc.) according to one embodiment. As shown, docking station 300 may include multiple bicycle docks, such as docks 302*a-e*. In this example, a single transit vehicle (e.g., any one of electric bicycles 304*a-d*) may dock in each of the docks 302*a-e* of the docking station 300. Each of the docks 302*a-e* may include a lock mechanism for receiving and locking docking mechanism 140 of the electric bicycles 304*a-d*. In some embodiments, once a transit vehicle is docked in a bicycle dock, the dock may be electronically coupled to the transit vehicle (e.g., controllers 312*a-d* of the transit vehicle) via a link such that the transit vehicle and the dock may communicate with each other via the link.

A user may use a user device (e.g., user device 130) to use a micromobility transit vehicle 110*b-d* that is docked in one of the bicycle docks 302*a-e* by transmitting a request to management system 240. Once the request is processed, management system 240 may transmit an unlock signal to a micromobility transit vehicle 110*b-d* docked in the dock and/or the dock via network 250. The docking station 300 may automatically unlock the lock mechanism to release the micromobility transit vehicle 110*b-d* based on the unlock signal. In some embodiments, each of the docks 302*a-e* may also be configured to charge batteries (e.g., batteries 324*a-c*) of the electric bicycle 304*a-d*, respectively, when the electric bicycle 304*a-d* are docked at the docks 302*a-e*. In some embodiments, docking station 300 may also be configured to transmit information associated with the docking station 300 (e.g., a number of transit vehicles docked at the docking station 300, charge statuses of the docked transit vehicles, etc.) to the management system 240.

Figure 4:
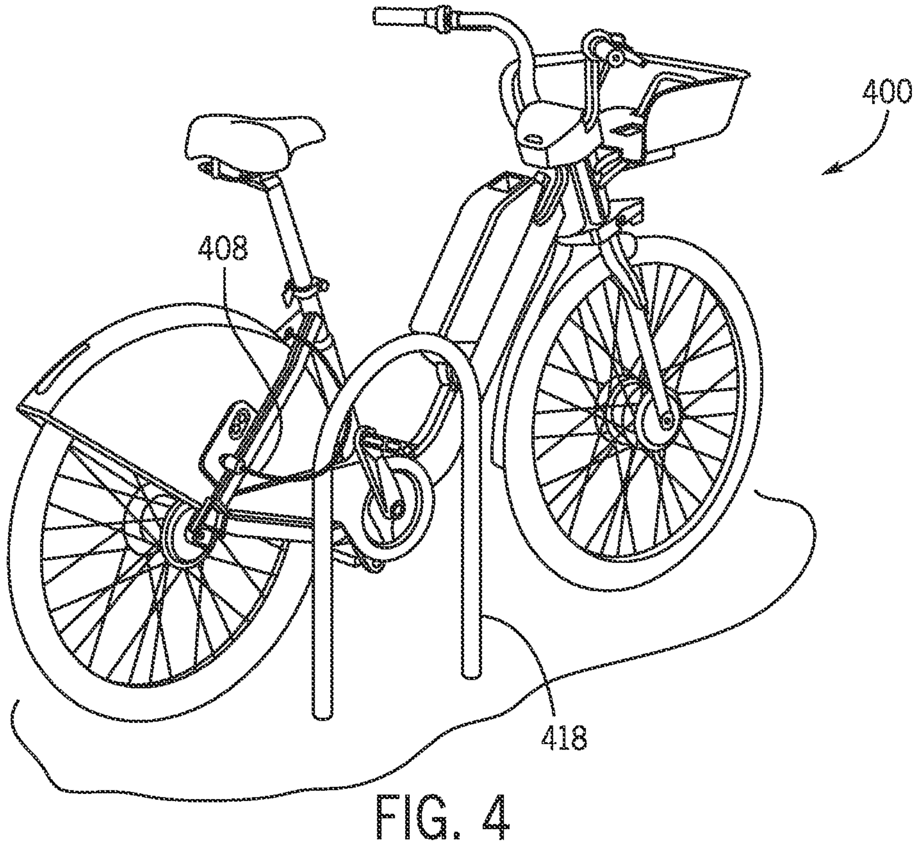
FIG. 4 illustrates a diagram of a micromobility transit vehicle properly locked to a structure in accordance with an embodiment of the disclosure.
Figure 5:
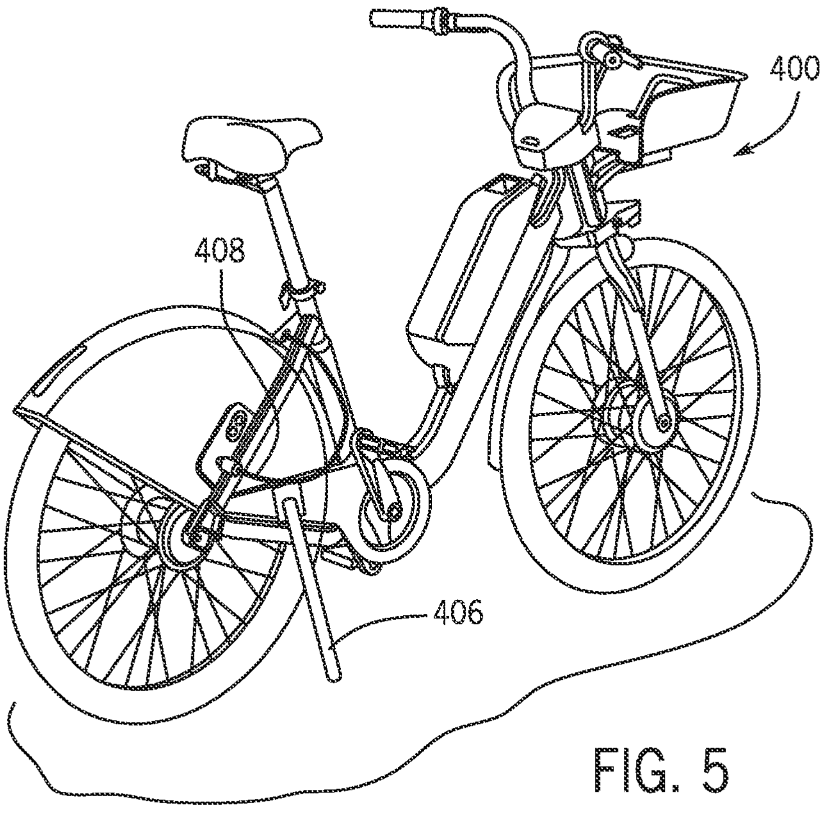
FIG. 5 illustrates a diagram of a micromobility transit vehicle in a free lock condition in accordance with an embodiment of the disclosure.

FIG. 4 illustrates a diagram of a micromobility transit vehicle 400 properly locked to a structure in accordance with an embodiment of the disclosure. FIG. 5 illustrates a diagram of the micromobility transit vehicle 400 in a free lock condition in accordance with an embodiment of the disclosure. Referring to FIGS. 4 and 5, the micromobility transit vehicle 400 may include many configurations. For example, the micromobility transit vehicle 400 may be an electric bike (or e-bike), similar to the micromobility transit vehicle 110*b* of FIG. 3A, discussed above. As shown, the micromobility transit vehicle 400 may include a kickstand 406 and a security device 408, in addition to one or more elements of micromobility transit vehicle 110*b* discussed above. The kickstand 406 may be any device configured to keep the micromobility transit vehicle 400 upright without leaning against another objector the aid of a person. For example, the kickstand 406 may be a side kickstand mounted to a frame of the micromobility transit vehicle 400, such as to one or more chain stays of the frame, among other locations of the frame. To support the micromobility transit vehicle 400 in an upright position, the kickstand 406 may be flipped down from the frame to contact the ground when the micromobility transit vehicle 400 is leaned against the kickstand 406. In this manner, the micromobility transit vehicle 400 may be rotated about a longitudinal axis running from the front of the micromobility transit vehicle 400 to its rear to lean the micromobility transit vehicle 400 against the kickstand 406.

The security device 408 may be configured to lock the micromobility transit vehicle 400 to a structure, such as to a bike rack, a pole, or other suitable fixed structure. The security device 408 may be similar to the vehicle security device 144 of FIG. 3A, discussed above. For example, the security device 408 may be cable-type lock that wraps around and/or through a secure pole, fence, or bicycle rack, among others. As best shown in FIG. 3A, the security device 408 includes a cable with a first fixed end attached to the micromobility transit vehicle 400, and a second free end defining a locking pin. The security device 408 also includes a pin holster and a pin latch each attached to the micromobility transit vehicle 400, the pin holster releasably holding the locking pin during transport and the pin latch lockably receiving the locking pin to secure the micromobility transit vehicle 400 to an object. For example, as shown in FIG. 4, the locking pin may be removed from the pin holster and the cable wrapped around and/or through a bicycle rack 418 to secure the locking pin to the pin latch and the micromobility transit vehicle 400 to the bicycle rack 418. In some embodiments, the locking pin may engage a docking station (e.g., docking station 300) to secure the micromobility transit vehicle 400 to the docking station.

In some embodiments, a rider of the micromobility transit vehicle 400 may be required to secure the locking pin to the pin latch to end or complete a ride. For example, one or more sensors may be associated with the pin latch and/or the locking pin to sense a locked condition of the security device 408. If the one or more sensors detect the locking pin secured to the pin latch, the operator (and/or management system 240) may be able to end or complete the ride. However, if the locking pin is not secured to the pin latch, the operator (and/or management system 240) may not be able to end or complete the ride, which may result in the operator not being able to secure further ridesharing services (being "stuck in ride") or the operator being charged additional fees/costs until the micromobility transit vehicle 400 is locked. These and other considerations can lead the operator to "free lock" the micromobility transit vehicle 400. As described herein, "free lock," "free locked," or "free locking" (or any other term to describe a free lock condition) refers to when the rider does not lock the micromobility transit vehicle 400 to proper infrastructure (e.g., a pole, bicycle rack, etc.), but instead locks the micromobility transit vehicle 400 to itself. An example of a free lock condition is shown in FIG. 5. As shown, the locking pin is secured to the pin latch, but the micromobility transit vehicle 400 is otherwise free to move. Often, the micromobility transit vehicle 400 is leaned against its kickstand 406 when in the free lock condition, as shown in FIG. 5, but can be leaned against an object, such as a pole, wall, or other structure, without being locked to the object.

Figure 6A:
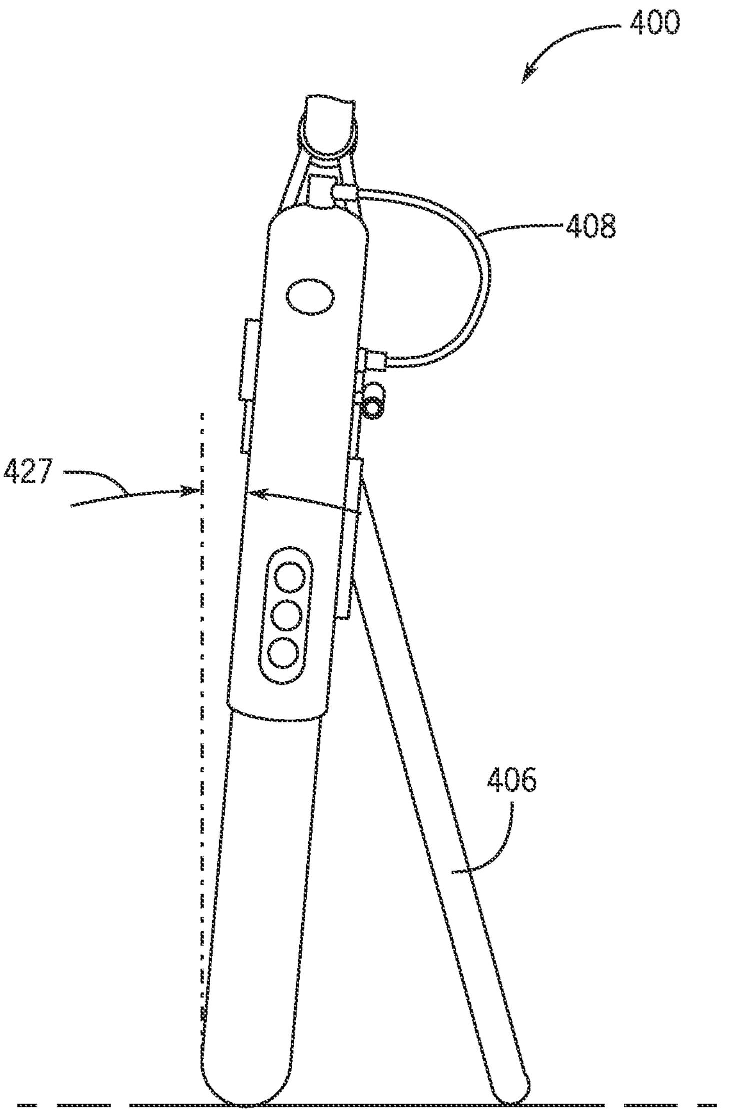
FIG. 6A illustrates a diagram of a micromobility transit vehicle and showing a roll angle of the micromobility transit vehicle in accordance with an embodiment of the disclosure.
Figure 6B:
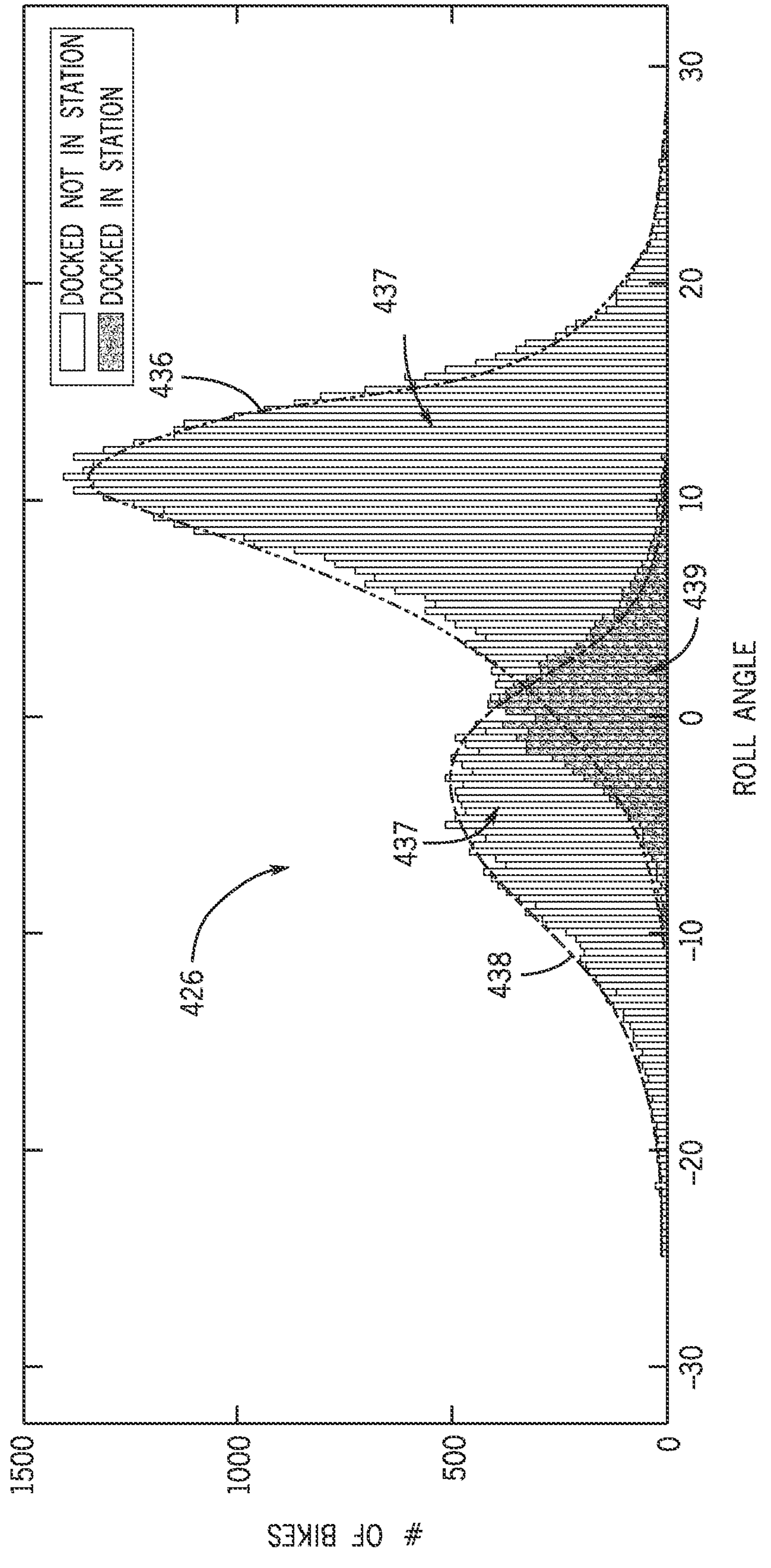
FIG. 6B illustrates a diagram of a data curve of potential roll angles of a micromobility transit vehicle during a locked condition of the micromobility transit vehicle and used to determine a free lock condition of a micromobility transit vehicle in accordance with an embodiment of the disclosure.
Figure 7:
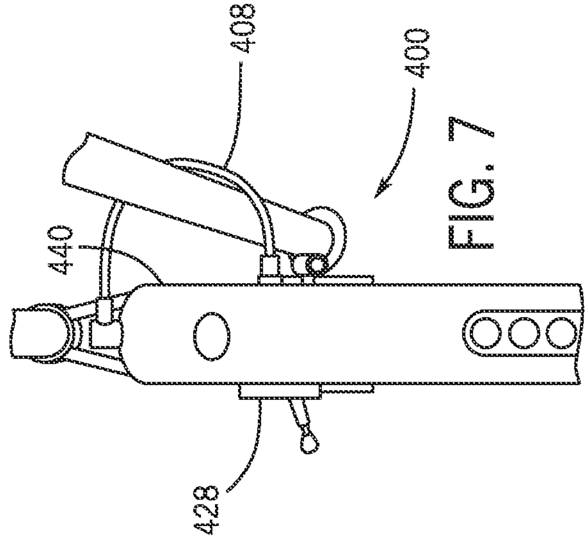
FIG. 7 illustrates a diagram of a micromobility transit vehicle equipped with an external accelerometer in accordance with an embodiment of the disclosure.
Figure 8:
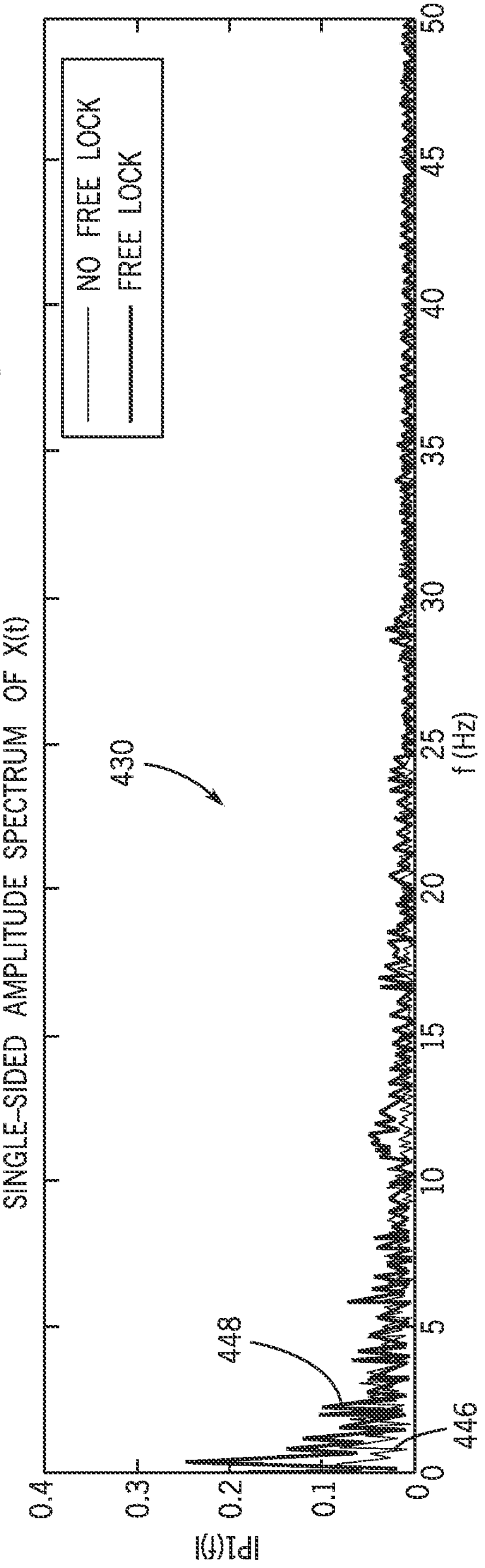
FIG. 8 illustrates a diagram of a graph comparing recorded vibration data of a free-locked micromobility transit vehicle and a properly locked micromobility transit vehicle in accordance with an embodiment of the disclosure.

FIG. 6A illustrates a diagram of the micromobility transit vehicle 400 and showing a roll angle 427 of the micromobility transit vehicle 400 in accordance with an embodiment of the disclosure. FIG. 6B illustrates a diagram of a data curve 426 of recorded roll angles 427 of the micromobility transit vehicle 400 during a locked condition of the micromobility transit vehicle 400 and used to determine a free lock condition of the micromobility transit vehicle 400 in accordance with an embodiment of the disclosure. FIG. 7 illustrates a diagram of the micromobility transit vehicle 400 equipped with an external accelerometer 428 in accordance with an embodiment of the disclosure. FIG. 8 illustrates a diagram of a data curve 430 comparing recorded vibration data of a free-locked micromobility transit vehicle 400 and a properly locked micromobility transit vehicle 400 in accordance with an embodiment of the disclosure. Referring to FIGS. 6A-8, it may be desirable to detect whether the micromobility transit vehicle 400 is in a free lock condition. For instance, local regulations may require all or a subset of micromobility transit vehicles to be securely locked to a fixed structure. Violation of these requirements can damage city relations, lead to numerous and expensive fines imposed on a ridesharing company, and destroy public confidence and perception of the ridesharing company and industry, among other consequences.

Referring to FIGS. 6A and 6B, a free lock condition of the micromobility transit vehicle 400 may be determined using a recorded or detected roll angle 427 of the micromobility transit vehicle 400 when parked. As shown in FIG. 6A, the roll angle 427 refers to the angular position of the micromobility transit vehicle 400 in relation to vertical (i.e., the deviation of the micromobility transit vehicle 400 from the vertical axis). For example, when the micromobility transit vehicle 400 is vertical (vertically plumb) the roll angle 427 may be 0 degrees. If the micromobility transit vehicle 400 is canted to the right from vertical (as shown in FIG. 6A), the micromobility transit vehicle 400 may include a positive roll angle 427. Similarly, if the micromobility transit vehicle 400 is canted to the left from vertical, the micromobility transit vehicle 400 may include a negative roll angle 427. In such embodiments, the micromobility transit vehicle 400 may include an inertial measurement unit (IMU) configured to sense the micromobility transit vehicle's angular rate and orientation, among others, relative to a reference frame. For example, the IMU may detect changes in any combination of the three vehicle axes: pitch, roll, and yaw, such as in each of the vehicle axes, in only two of the vehicle axes (pitch and roll), or in only one of the vehicle axes (roll only). The IMU may include an accelerometer, a gyroscope, and a magnetometer, or any combination thereof, per detection axis. For example, the IMU may detect roll angle 427 of the micromobility transit vehicle 400.

Depending on the application, the IMU may continuously monitor the roll angle 427 of the micromobility transit vehicle 400, or the IMU may take a measurement of the roll angle 427 at a predefined time after sensing a locked condition of the security device 408. The waiting period after sensing a locked condition of the security device 408 may be beneficial to make sure the data is clean (e.g., accurately represents a parked/locked condition). For example, the operator may still move the micromobility transit vehicle 400 in the moment of locking the security device 408 or immediately thereafter, such as lean the micromobility transit vehicle 400 against a wall or other object, taking objects from a storage basket or container, or otherwise causing vibrations and other motions impacting the roll angle measurement. An example waiting period may be between about 15 seconds and about 25 seconds (e.g., about 20 seconds) after sensing a locked condition of the security device 408, although other waiting times are contemplated, including less than 15 seconds or greater than 25 seconds.

The data curve 426 of FIG. 6B illustrates the number of bikes (y-axis) as a function of potential roll angles 427 of the micromobility transit vehicle 400 (x-axis) after the security device 408 is locked. As shown, the distribution of roll angles may form or generally define a first Gaussian curve 436 overlapping a second Gaussian curve 438. Each of the first Gaussian curve 436 and the second Gaussian curve 438 (or at least non-overlapping portions 437 of the first Gaussian curve 436 and the second Gaussian curve 438) may be associated with the micromobility transit vehicle 400 parked outside of a docking station. In some embodiments, the common area 439 of the first Gaussian curve 436 and the second Gaussian curve 438 may be associated with the micromobility transit vehicle 400 parked (or docked) to a docking station. Accordingly, the common area 439 may be centered around a 0-degree roll angle, representing the micromobility transit vehicle 400 docked vertically or substantially vertically at a docking station.

The first Gaussian curve 436 may represent a frequency distribution of roll angles 427 when the micromobility transit vehicle 400 is leaning on the kickstand 406. As shown, the first Gaussian curve 436 may be centered around a 10 to 12 degree roll angle, although other configurations are contemplated. The distribution of the first Gaussian curve 436 may be affected by many factors, including uneven or unlevel ground, the kickstand 406 changing positions on the micromobility transit vehicle 400 and/or changing its length, such as with extendable kickstands, securement to a flimsy object allowing the micromobility transit vehicle 400 to lean on its kickstand 406, among others. Because the likelihood of a free locked condition is higher when the micromobility transit vehicle 400 is leaning on its kickstand 406, the first Gaussian curve 436 may represent roll angles 427 when the micromobility transit vehicle 400 is in a free lock condition.

The second Gaussian curve 438 may represent a frequency distribution of roll angles 427 when the micromobility transit vehicle 400 is not leaning on the kickstand 406. As shown, the second Gaussian curve 438 may be centered around a −5 to −3 degree roll angle, although other configurations are contemplated. The distribution of the second Gaussian curve 438 may be affected by many factors, including uneven or unlevel ground, leaning the micromobility transit vehicle 400 against an object without securement thereto (e.g., a wall), the type or size of the fixed structure the micromobility transit vehicle 400 is secured to, among others. The second Gaussian curve 438 may represent roll angles 427 when the micromobility transit vehicle 400 is not in a free lock condition (i.e., properly secured to a fixed structure).

The data curve 426 of FIG. 6B may be used to determine a free lock condition of the micromobility transit vehicle 400. For example, a received roll angle from the IMU along the non-overlapping portion of the first Gaussian curve 436 may indicate or suggest that the micromobility transit vehicle 400 is in a free lock condition. Alternatively, a received roll angle from the IMU along the non-overlapping portion of the second Gaussian curve 438 may indicate or suggest that the micromobility transit vehicle 400 is secured to a structure when the locking pin is secured to the pin latch.

Referring to FIG. 7, a free lock condition of the micromobility transit vehicle 400 may be determined using one or more proximity sensors 440 associated with the micromobility transit vehicle 400. For example, the one or more proximity sensors 440 may be attached to, integrated with, or otherwise coupled to the micromobility transit vehicle 400 near the security device 408 (e.g., near the pin latch). The proximity sensor(s) 440 may be positioned to detect a pole, bike rack, or other structure to which the security device 408 is secured (e.g., to detect wrapping of the cable of the security device 408 about the structure). For example, the proximity sensor 440 may be configured to detect one or more objects positioned within the loop created by the security device 408 (e.g., a pole, bicycle rack, etc.). The proximity sensor(s) 440 may be a light-based proximity sensor, an ultrasonic proximity sensor, an infrared proximity sensor, among others, or any combination thereof. In one embodiment, the proximity sensor(s) 440 may utilize camera computer vision to classify the structure to which the security device 408 is secured, if any.

Referring to FIGS. 7 and 8, a free lock condition of the micromobility transit vehicle 400 may be determined using recorded or detected vibration data of the micromobility transit vehicle 400. For example, vibration data may be gathered by one or more accelerometers of the IMU or may be gathered by an external accelerometer 428 attached to the micromobility transit vehicle 400, such as near the pin latch. In such embodiments, the external accelerometer 428 and/or the IMU may detect vibrations of the micromobility transit vehicle 400 while the security device 408 is being locked. For example, the external accelerometer 428 and/or the IMU may gather vibration data from just prior to the security device 408 being locked to a period after the security device 408 is locked.

The graph of FIG. 8 illustrates two frequency spectrums of gathered vibration data for the micromobility transit vehicle 400. Specifically, a first frequency spectrum 446 illustrates a frequency spectrum of the micromobility transit vehicle 400 in a free lock condition, and a second frequency spectrum 448 illustrates a frequency spectrum of the micromobility transit vehicle 400 when properly locked to a structure. As shown, there are accelerometer pattern differences between the free lock condition and a properly locked condition of the micromobility transit vehicle 400. For example, a free-locked micromobility transit vehicle 400 may exhibit a smaller vibration frequency spectrum because the cable of the security device 408 is not being secured to a structure. In addition, free locking the micromobility transit vehicle 400 may take less time to lock the security device 408. Similar or other differences may be found in a time-domain analysis of the vibration data. For example, differences may exist in mean, median, standard deviation, power, or other time-domain features of the vibration signals for both scenarios (free locking vs. non-free locking).

The data curves 430 of FIG. 8 may be used to determine a free lock condition of the micromobility transit vehicle 400. For instance, detected vibration data may be compared to the first frequency spectrum 446 and the second frequency spectrum 448. If the detected vibration data more closely resembles the first frequency spectrum 446, the vibration data may indicate or suggest that the micromobility transit vehicle 400 is in a free lock condition. Similarly, if the detected vibration data more closely resembles the second frequency spectrum 448, the vibration data may indicate or suggest that the micromobility transit vehicle 400 is secured to a structure. In one embodiment, the determination is based on whether the detected vibration data is closer to the first frequency spectrum 446 or the second frequency spectrum 448. In one embodiment, the determination is based on whether the detected vibration data meets a threshold characteristic of either the first frequency spectrum 446 or the second frequency spectrum 448. For example, if the detected vibration data is more than 50% similar (e.g., more than 60% similar, more than 70% similar, more than 80% similar, more than 90% similar, etc.) to the first frequency spectrum 446, the vibration data may indicate or suggest that the micromobility transit vehicle 400 is in a free lock condition. Similarly, if the detected vibration data is more than 50% similar (e.g., more than 60% similar, more than 70% similar, more than 80% similar, more than 90% similar, etc.) to the second frequency spectrum 448, the vibration data may indicate or suggest that the micromobility transit vehicle 400 is secured to a structure.

In various embodiments, free locking may be detected using any combination of roll angle data, accelerometer data, and proximity sensor data. For example, free locking may be detected using both roll angle data and accelerometer data. Specifically, accelerometer data may be used to confirm free locking as suggested by roll angle data, or roll angle data may be used to confirm free locking as suggested by accelerometer data. In some embodiments, the accelerometer data may be relied upon if the roll angle data is unavailable or determined to be inaccurate. Similarly, the roll angle data may be relied upon if the accelerometer data is unavailable or determined to be inaccurate. Data from proximity sensor 440 may be used to confirm or supplement the roll angle data and/or the accelerometer data in a similar manner. Thus, the accuracy of the free locking determination may be increased by receiving multiple indications from the roll angle data, accelerometer data, and proximity sensor data (or any combination thereof). Multiple indications from the different data sources may also reduce the likelihood of false positives or false negatives from any one data source.

Figure 9:
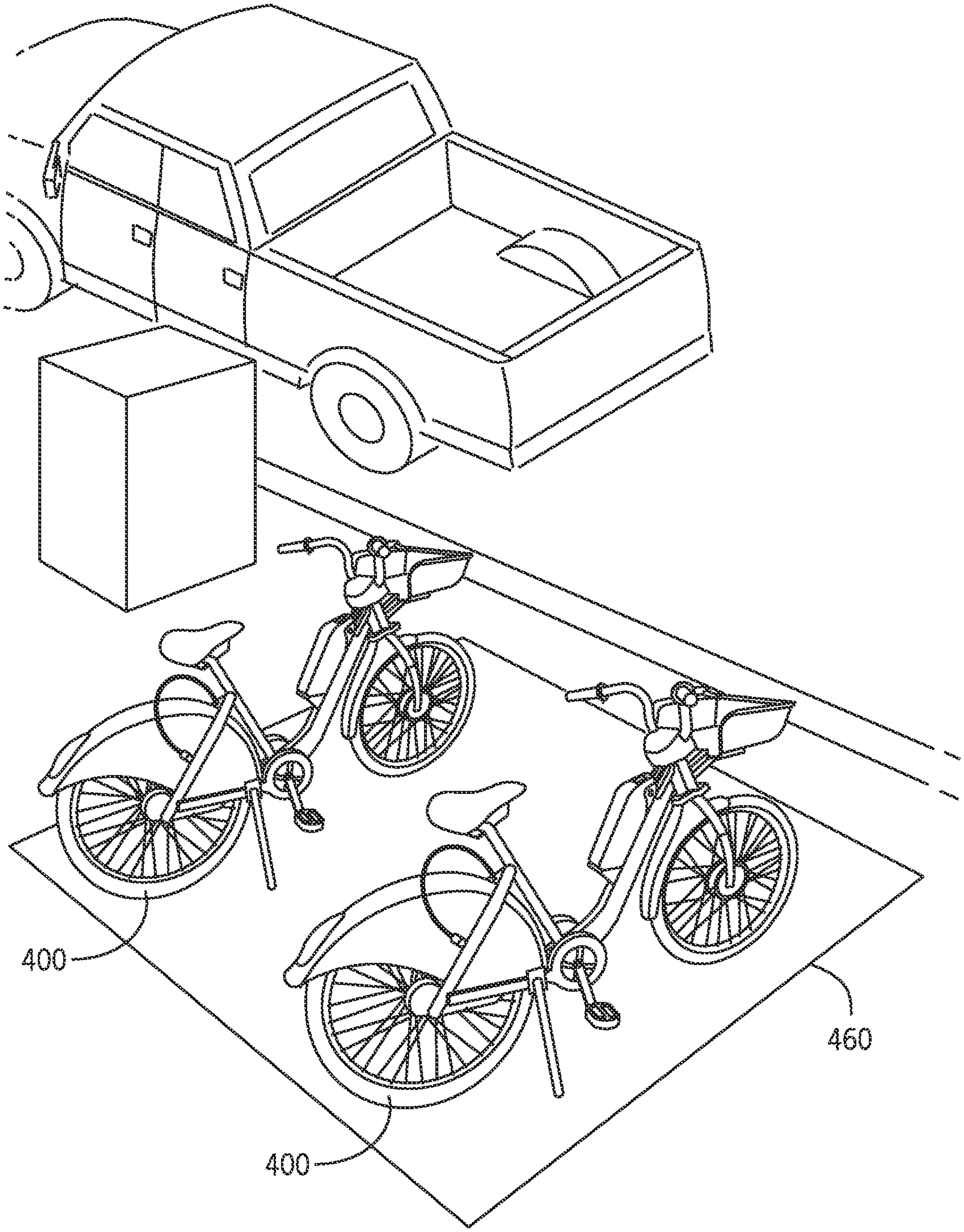
FIG. 9 illustrates a diagram of a first detectable virtual station for parking a micromobility transit vehicle in accordance with an embodiment of the disclosure.
Figure 10:
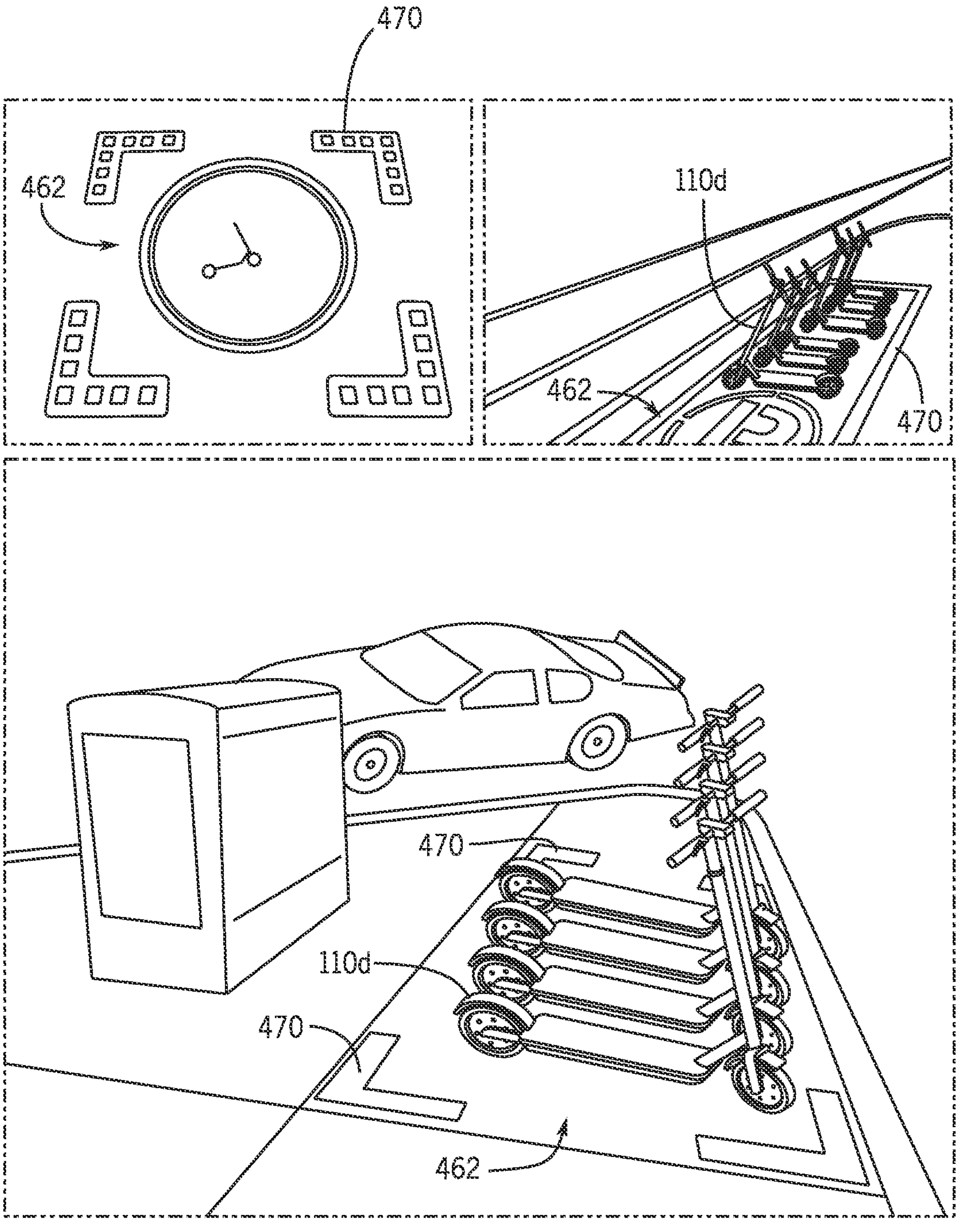
FIG. 10 illustrates diagrams of alternative embodiments of a second detectable virtual station for parking a micromobility transit vehicle in accordance with an embodiment of the disclosure.
Figure 11:
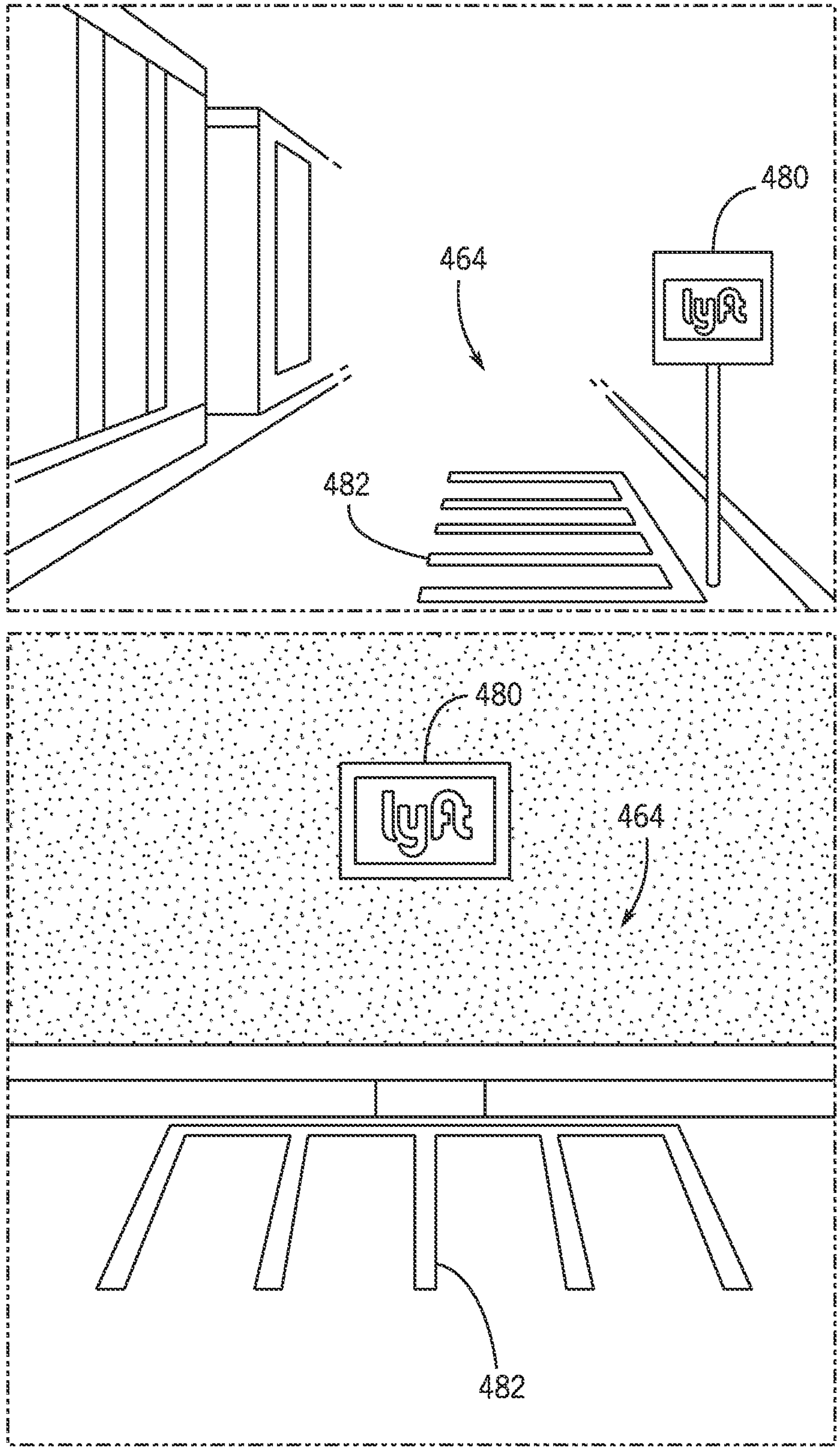
FIG. 11 illustrates diagrams of alternative embodiments of a third detectable virtual station for parking a micromobility transit vehicle in accordance with an embodiment of the disclosure.
Figure 12:
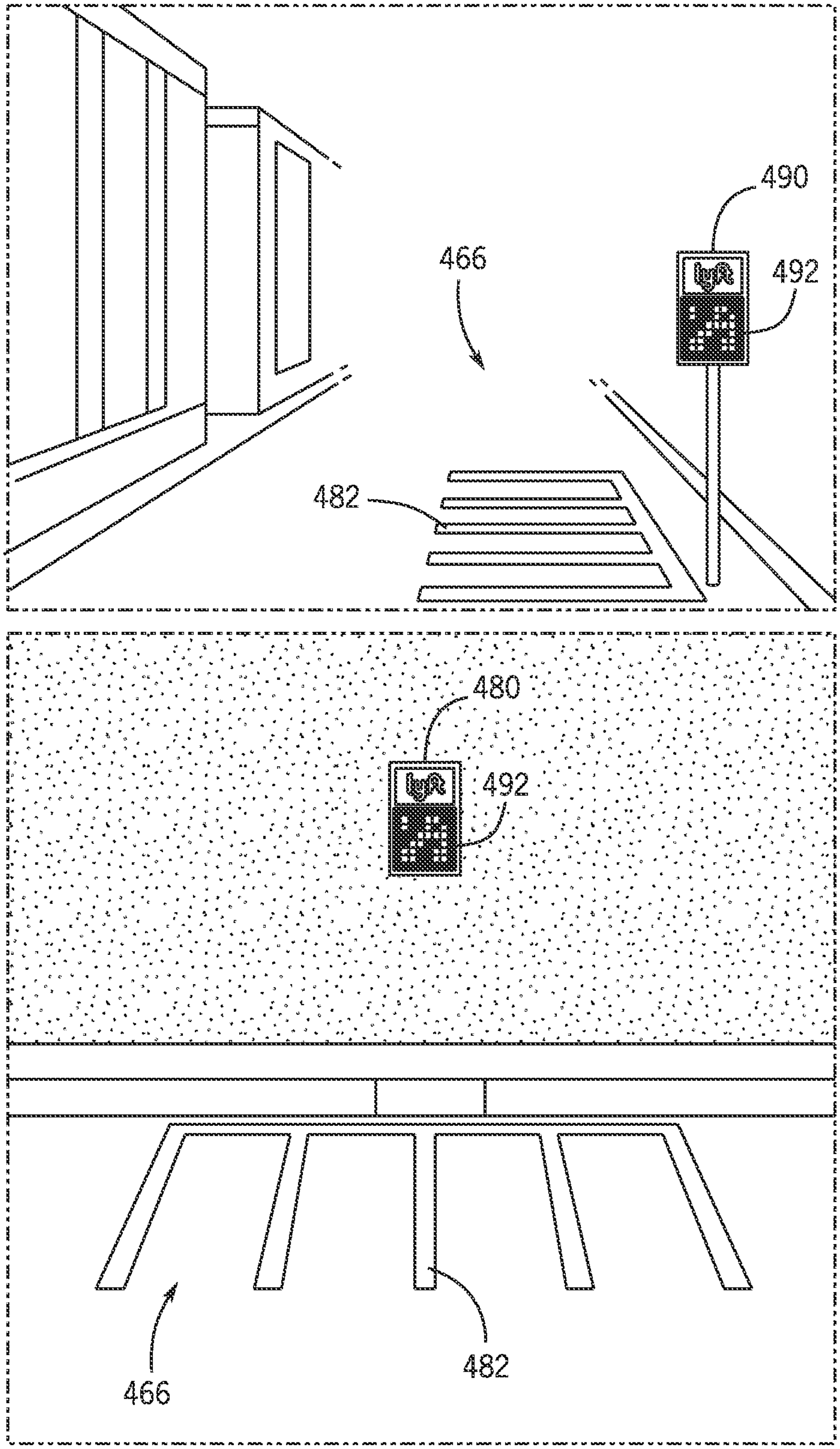
FIG. 12 illustrates diagrams of alternative embodiments of a fourth detectable virtual station for parking a micromobility transit vehicle in accordance with an embodiment of the disclosure.
Figure 13:
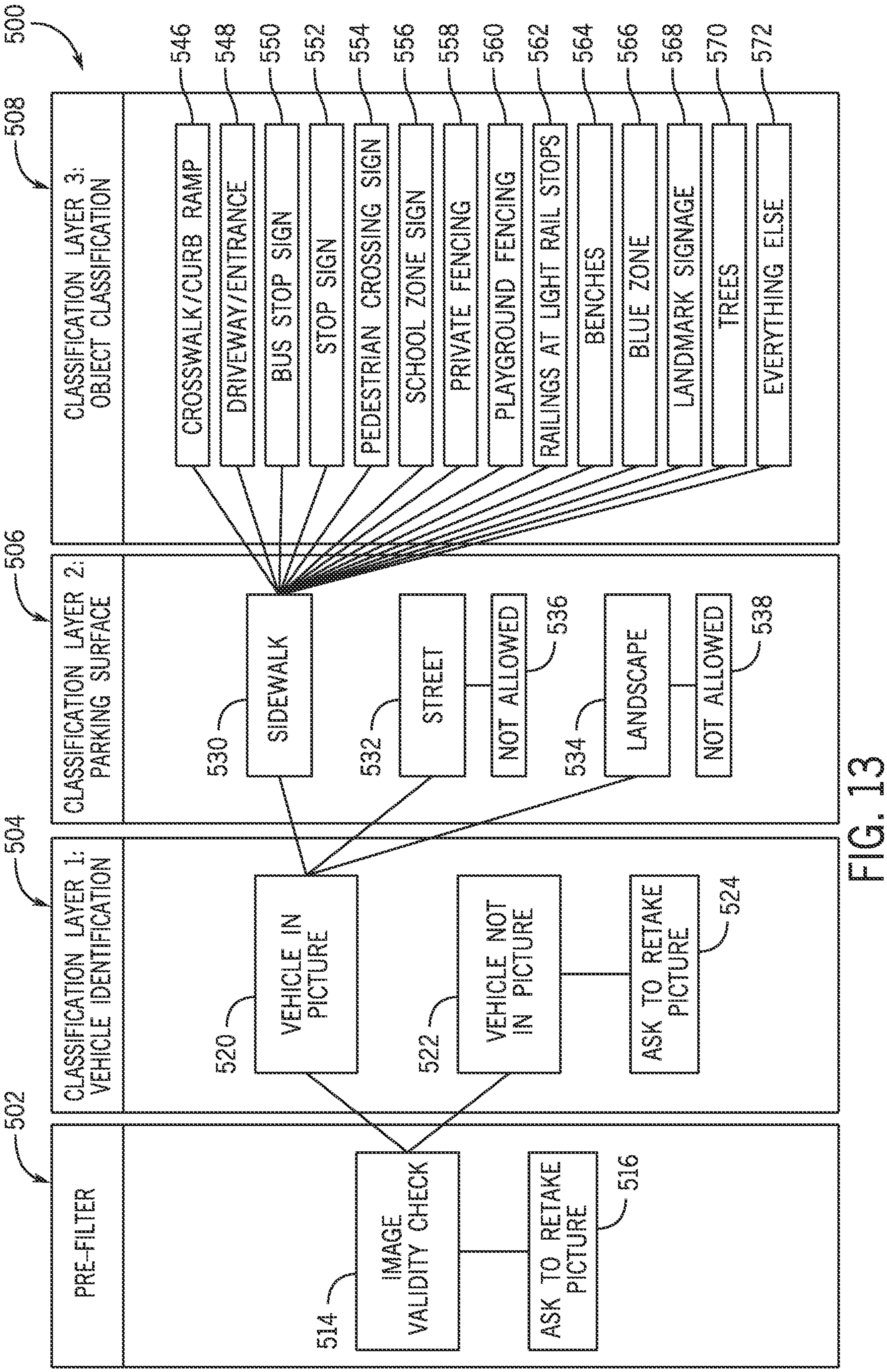
FIG. 13 illustrates a diagram of an end-of-ride analysis hierarchy for determining whether a micromobility transit vehicle is properly parked at end-of-ride in accordance with an embodiment of the disclosure.

FIG. 9 illustrates a diagram of a first detectable virtual station 460 for parking a micromobility transit vehicle (e.g., any of transit vehicles 110_b_, 110_c_, 110_d_ or the micromobility transit vehicle 400) in accordance with an embodiment of the disclosure. FIG. 10 illustrates diagrams of alternative embodiments of a second detectable virtual station 462 for parking a micromobility transit vehicle (e.g., any of transit vehicles 110_b_, 110_c_, 110_d_ or the micromobility transit vehicle 400) in accordance with an embodiment of the disclosure. FIG. 11 illustrates diagrams of alternative embodiments of a third detectable virtual station 464 for parking a micromobility transit vehicle (e.g., any of transit vehicles 110_b_, 110_c_, 110_d_ or the micromobility transit vehicle 400) in accordance with an embodiment of the disclosure. FIG. 12 illustrates diagrams of alternative embodiments of a fourth detectable virtual station 466 for parking a micromobility transit vehicle (e.g., any of transit vehicles 110_b_, 110_c_, 110_d_ or the micromobility transit vehicle 400) in accordance with an embodiment of the disclosure. FIG. 13 illustrates a diagram of an end-of-ride analysis hierarchy for determining whether a micromobility transit vehicle (e.g., any of transit vehicles 110_b_, 110_c_, 110_d_ or the micromobility transit vehicle 400) is properly parked at end-of-ride in accordance with an embodiment of the disclosure. Referring to FIGS. 9-13, it may be desirable to detect improper parking behavior of a micromobility transit vehicle separate from or in combination with detecting a free lock condition of the micromobility transit vehicle. For example, local regulations may require micromobility vehicles to be locked to designated structures only and/or parked in designated locations only. Violation of these requirements can damage city relations, lead to numerous and expensive fines imposed on a ridesharing company, and destroy public confidence and perception of the ridesharing company and industry, among other consequences.

As described herein, a "virtual station" refers to an area, location, spot, or other dedicated parking location without a docking station. The virtual stations may be detectable using image detection algorithms. For example, the virtual stations may be detectable through distinct coloring, patterns, signs, placards, markers, or images, among others. FIGS. 9-12 illustrate examples of detectable virtual stations, although other examples are contemplated.

Referring to FIG. 9, a first detectable virtual station 460 may be set off by a distinct color, texture, and/or pattern. For example, the first detectable virtual station 460 may include or be painted with a color different than the surrounding surface(s), include a pattern distinct from the surrounding surface(s), include a piece of material of different texture than the surrounding surface(s), or a combination thereof. In some embodiments, the first detectable virtual station 460 may be embodied as one or more elements (e.g., tiles) placed or secured to the ground, or the first detectable virtual station 460 may be created by painting the ground a distinct color or pattern. Using cameras and image detection algorithms, a system may determine whether a micromobility transit vehicle is parked within the first detectable virtual station 460. For example, an end-of-ride image may be analyzed to determine if a micromobility transit vehicle is completely within the first detectable virtual station 460, partially within the first detectable virtual station 460, or outside of the first detectable virtual station 460.

Referring to FIG. 10, a second detectable virtual station 462 may be outlined with a distinct color, texture, and/or pattern. For instance, an outline 470 of the second detectable virtual station 462 may include or be painted with a color and/or pattern distinct from the surrounding surface(s). Like the first detectable virtual station 460, the second detectable virtual station 462 may be embodied as one or more distinct elements (e.g., tiles) placed or secured to the ground, or the second detectable virtual station 462 may be created by painting the outline 470 a distinct color or pattern. Cameras and image detection algorithms may be used to determine whether a micromobility transit vehicle is parked within the second detectable virtual station 462. For example, an end-of-ride image may be analyzed to determine if a micromobility transit vehicle is completely within the second detectable virtual station 462, partially within the second detectable virtual station 462, or outside of the second detectable virtual station 462.

Referring to FIG. 11, a third detectable virtual station 464 may be set off with a distinct sign or placard 480. For instance, the sign 480 may include one or more distinct indicia, such as a company logo, trade dress, or other distinguishing mark. The sign 480 may be an unnoticeable, non-obvious marker. In some embodiments, the sign 480 may be securely attached to a building or fixed post to reduce the likelihood of vandalism. As shown, the third detectable virtual station 464 may include one or more parking lanes or spots outlined by striping 482 on the sidewalk, parking lot, or other parking locations. The sign 480 and/or striping 482 (e.g., a striping pattern) may be used to estimate distance, such as a distance between a micromobility transit vehicle and the sign 480 and/or third detectable virtual station 464. Cameras and image detection algorithms may be used to detect the sign 480 and/or the striping 482 to identify the third detectable virtual station 464. Cameras and image detection algorithms may also be used to determine whether a micromobility transit vehicle is parked within the third detectable virtual station 464, such as within one of the spots or lanes of the third detectable virtual station 464. For example, an end-of-ride image may be analyzed to determine if a micromobility transit vehicle is completely within the third detectable virtual station 464, partially within the third detectable virtual station 464, or outside of the third detectable virtual station 464.

Referring to FIG. 12, a fourth detectable virtual station 466 may be similar to the third detectable virtual station 464. Like the third detectable virtual station 464, the fourth detectable virtual station 466 may be set off with a sign 490 having one or more distinct indicia. As shown, the sign 490 may include a 2D barcode 492. The 2D barcode 492 may include many configurations. For example, the 2D barcode 492 may be a matrix or QR barcode, a serial number barcode, or other barcode type. In some embodiments, the 2D barcode 492 may be an ArUco marker corresponding to a number encoded into a small grid of black and white pixels. In some embodiments, the 2D barcode 492 may be used to estimate distance (e.g., a distance between a micromobility transit vehicle and the sign 490 and/or fourth detectable virtual station 466), position, and/or orientation. For example, the 2D barcode 492 may be used to estimate the roll angle 427 of micromobility transit vehicle 400 when parked. Cameras and image detection algorithms may be used to detect the sign 490 (e.g., the 2D barcode 492) and/or striping 482 (e.g., a striping pattern) to identify the fourth detectable virtual station 466. Cameras and image detection algorithms may also be used to determine whether a micromobility transit vehicle is parked within the fourth detectable virtual station 466, such as within one of the spots or lanes of the fourth detectable virtual station 466. For example, an end-of-ride image may be analyzed to determine if a micromobility transit vehicle is completely within the fourth detectable virtual station 466, partially within the fourth detectable virtual station 466, or outside of the fourth detectable virtual station 466.

In some embodiments, wireless signals or data may be used to determine whether a micromobility transit vehicle (e.g., the micromobility transit vehicle 400) is properly parked, such as in or near any of the virtual stations described above or other dedicated parking area. For example, a WiFi, Bluetooth, ultra-wide-band, radio-frequency identification, near-field communication, and/or ultrasound module (e.g., transmitter, transceiver, or receiver) may be placed at or near a dedicated parking area (e.g., at or near any of the virtual stations described above). In such embodiments, the micromobility transit vehicle 400 may be configured to communicate with the modules to determine placement of the micromobility transit vehicle 400 relative to the dedicated parking area, for example using time-of-flight, signal strength, or other distance/position detection means.

Referring to FIG. 13, an end-of-ride analysis 500 may be implemented to determine whether a micromobility transit vehicle (e.g., the micromobility transit vehicle 400) is properly parked using an end-of-ride image taken by the operator. As shown, the end-of-ride analysis 500 may include a hierarchical structure, with multiple analysis layers subordinate to a previous analysis layer. The end-of-ride analysis 500 may include a first analysis layer 502, a second analysis layer 504 subordinate to the first analysis layer 502, a third analysis layer 506 subordinate to the second analysis layer 504, and a fourth analysis layer 508 subordinate to the third analysis layer 506. Each analysis layer may include one or more analysis steps or stops. The outcome of each analysis step may lead to another analysis step, a different analysis layer, a determination, or a request for user action.

The first analysis layer 502 may be a pre-filter analysis layer with a single analysis step. For example, in Block 514, an image validity check may be performed on the end-of-ride image. The image validity check of Block 514 may include checking the end-of-ride image for validity, damage, corruption, and/or completeness. For instance, Block 514 may analyze the end-of-ride image to verify the image is not corrupted, damaged, or incomplete. In Block 516, the operator may be requested to retake the picture if the end-of-ride image is determined to be corrupted, damaged, or incomplete. An incomplete image may be determined if the captured image does not include enough of the micromobility transit vehicle 400 and/or surroundings needed by the analysis algorithms to determine how and/or where the micromobility transit vehicle 400 is parked or otherwise secured. Any of the analysis steps may be repeated if the operator retakes the end-of-ride image. If the end-of-ride image is determined to be valid and complete in Block 514, the end-of-ride analysis 500 may proceed to the second analysis layer 504.

The second analysis layer 504 may be a first classification layer and may include vehicle identification analysis. For instance, the second analysis layer 504 may determine whether the micromobility transit vehicle 400 is in the end-of-ride image. The second analysis layer 504 may include multiple analysis steps. For example, the analysis may proceed to Block 520 if the micromobility transit vehicle 400 is completely within the end-of-ride image. Alternatively, the analysis may proceed to Block 522 if the micromobility transit vehicle 400 is not in the end-of-ride image or only partially in the end-of-ride image less than a threshold amount. For example, even if the micromobility transit vehicle 400 is not completely within the end-of-ride image, but is 90% within the image with the threshold being 85%, the analysis may proceed to Block 520. However, if the micromobility transit vehicle 400 is 80% within the end-of-ride image, and the threshold is 85%, the analysis may proceed to Block 522. In Block 524, the operator may be requested to retake the picture if the micromobility transit vehicle 400 is only partially (less than a threshold amount) or not in the end-of-ride image. Any of the analysis steps may be repeated if the operator retakes the end-of-ride image. If the micromobility transit vehicle 400 is completely (or within a threshold amount) within the end-of-ride image, the end-of-ride analysis 500 may proceed to the third analysis layer 506.

The third analysis layer 506 may be a second classification layer and may include parking surface analysis. For instance, the third analysis layer 506 may determine where or on what surface the micromobility transit vehicle 400 is parked. The third analysis layer 506 may include multiple analysis steps. The analysis may proceed to alternative analysis steps or blocks depending on a determined parking location of the micromobility transit vehicle 400. For example, the analysis may proceed to Block 530 if the micromobility transit vehicle 400 is parked on a sidewalk, to Block 532 if the micromobility transit vehicle 400 is parked on the street, or Block 534 if the micromobility transit vehicle 400 is parked in a landscaped area. In some embodiments, the system may generate and send one or more notifications of improper parking conditions/behavior. For example, in Block 536, the system may generate and send one or more notifications that parking in the street is not allowed, and in Block 538, the system may generate and send one or more notifications that parking in a landscaped area is not allowed. The one or more notifications may be generated and sent for display on a mobile device, such as any of user device 130, 130*a*, or 130*b*. In some embodiments, Blocks 536 and 538 may include generating and sending a request for the operator to move the micromobility transit vehicle 400 to a proper parking area or location, which may or may not be indicated through a map or other navigation. Any of the analysis steps may be repeated if the operator moves the micromobility transit vehicle 400 and/or retakes the end-of-ride image. If the micromobility transit vehicle 400 is parked on a sidewalk, the end-of-ride analysis 500 may proceed to the fourth analysis layer 508.

The fourth analysis layer 508 may be a third classification layer and may include contextual location analysis. For instance, the fourth analysis layer 508 may contextualize where the micromobility transit vehicle 400 is parked. The fourth analysis layer 508 may include multiple analysis steps. The analysis may proceed to alternative analysis steps or blocks depending on a determined contextual location of the parked micromobility transit vehicle 400. For example, the analysis may determine, using image detection algorithms, where the micromobility transit vehicle 400 is parked on the sidewalk and/or to what type of structure the micromobility transit vehicle 400 is locked.

Depending on the determined contextual parking location, the analysis may alternatively proceed to one of the following analysis steps: crosswalk/curb ramp parking (Block 546), driveway/building entrance parking (Block 548), bus stop sign parking (Block 550), stop sign parking (Block 552), pedestrian crossing sign parking (Block 554), school zone sign parking (Block 556), private fencing parking (Block 558), playground fencing parking (Block 560), light rail railing parking (Block 562), public bench parking (Block 564), handicapped parking (Block 566), landmark signage parking (Block 568), tree parking (Block 570), or other parking (Block 572). For example, the analysis may use image detection algorithms to detect whether the micromobility transit vehicle 400 is parked at or near the areas identified in Blocks 546-572. More or less of the Blocks 546-570 may be used, depending on the area of the parking location or geographical area (e.g., San Francisco, Chicago, New York, or a more rural or less congested area).

One or more of Blocks 546-572 may be improper or proper based on local regulations. For example, Blocks 546-570 may correspond to improper parking conditions of the micromobility transit vehicle 400, and Block 572 may correspond to a proper parking condition. Although Blocks 546-572 are shown, the fourth analysis layer 508 may include additional analysis steps, or a reduced number of analysis steps based on local regulations. In Blocks 546-570, one or more notifications of improper parking behavior may be generated and sent, such as for display on a mobile device. In some embodiments, the operator may be notified of improper parking conditions/behavior. For example, in Blocks 546-570, the operator may be notified that the micromobility transit vehicle 400 is improperly parked. In some embodiments, Blocks 546-570 may include requesting the operator to move the micromobility transit vehicle 400 to a proper parking area or location, which may or may not include showing the area or location on a map or other means to navigate the operator to the proper area or location. Any of the analysis steps may be repeated if the operator moves the micromobility transit vehicle 400 and/or retakes the end-of-ride image. If the micromobility transit vehicle 400 is properly parked, the end-of-ride analysis 500 may end.

In some embodiments, the system may generate and send a push notification, an in-app notification, a voice call, an email, or any combination thereof providing notification of improper parking behavior. In some embodiments, various levels of notifications may be generated and sent based on the number and/or severity of the improper parking behavior of the micromobility transit vehicle 400. For example, a push notification with a gentle reminder of proper parking procedures may be generated and sent upon or after detection of a first parking violation. Upon or after detection of a second parking violation, the system may generate and send an email with a stern reminder of proper parking procedures. Upon or after detection of a third parking violation, a notification request may be generated and sent requesting or requiring an end-of-ride image be taken to confirm the micromobility transit vehicle 400 is properly parked before the ride is ended. Upon or after detection of a fourth parking violation, the system may generate and send a fine. The parking violations may be performed by the same entity, such as by the same rider, user, operator, operating group, fleet manager, etc. In such embodiments, the notifications, requests, or fines may be sent to the operator, operating group, fleet manager, etc. In some embodiments, these enforcement levels may be modified based on different factors, such as the seriousness of the parking violation or the frequency and types of violations. For example, parking the micromobility transit vehicle 400 in an area that impedes traffic or pedestrian flow may elevate the enforcement level for a given parking violation.

Figure 14:
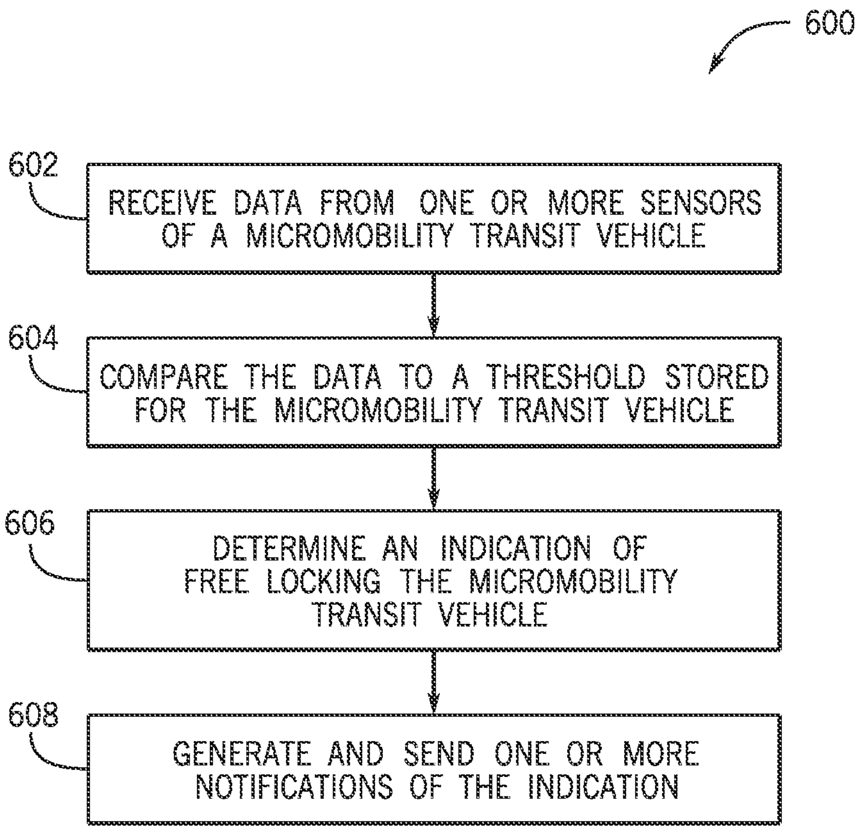
FIG. 14 illustrates a flow diagram of a process of determining a free lock condition of a micromobility transit vehicle in accordance with an embodiment of the disclosure.

FIG. 14 illustrates a flow diagram of a process 600 of determining a free lock condition of a micromobility transit vehicle in accordance with an embodiment of the disclosure. It should be appreciated that any step, sub-step, sub-process, or block of process 600 may be performed in an order or arrangement different from the embodiments illustrated by FIG. 14. For example, one or more blocks may be omitted from or added to the process 600. Although process 600 is described with reference to the embodiments of FIGS. 1-13, process 600 may be applied to other embodiments.

In Block 602, process 600 includes receiving data from one or more sensors of a micromobility transit vehicle. For example, a roll angle may be received from the IMU of the micromobility transit vehicle 400. In some embodiments, vibration data may be received from an accelerometer associated with the micromobility transit vehicle, such as from the IMU or the external accelerometer 428, described above. In one embodiment, data may be received from a proximity sensor of the micromobility transit vehicle, such as proximity sensor 440. The proximity sensor may be configured to detect whether a security device of the micromobility transit vehicle is secured to an object. In some embodiments, image data may be received from a camera associated with the micromobility transit vehicle or an operator of the micromobility transit vehicle, such as through an operator phone. Image data may assist in determining the terrain or environment where the micromobility transit vehicle is parked or locked.

In Block 604, process 600 includes comparing the data to a threshold stored for the micromobility transit vehicle. For instance, the roll angle received from the IMU may be compared to a threshold roll angle stored for the micromobility transit vehicle. For example, the threshold roll angle may be between about 10 degrees and about 12 degrees, although other angles are contemplated, including between about 9 degrees and about 13 degrees, between about 5 degrees and about 15 degrees, or the like. The threshold roll angle may be a roll angle unique to the micromobility transit vehicle. For example, the threshold roll angle may be based on a unique length of the kickstand 406. Particularly, if variations exist in the length of the kickstand 406 from vehicle to vehicle, the actual length of the kickstand 406 may be used to adjust the threshold roll angle for the micromobility transit vehicle. In some embodiments, the threshold roll angle may be based on ground terrain. For instance, process 600 may include determining a ground angle based on a location of the micromobility transit vehicle, such as based on GPS, topography, or map data. In such embodiments, process 600 may include adjusting the threshold roll angle based on the determined ground angle to account for unlevel terrain. For example, if the micromobility transit vehicle is leaned uphill, the threshold roll angle may be reduced. Similarly, if the micromobility transit vehicle is leaned downhill, the threshold roll angle may be increased.

In some embodiments, Block 604 may include comparing vibration data to at least one of a threshold frequency spectrum stored for the micromobility transit vehicle or one or more time-domain features stored for the micromobility transit vehicle. Like the threshold roll angle, the threshold frequency spectrum and/or time-domain features may be unique to the micromobility transit vehicle, such as based on the unique specifications of the micromobility transit vehicle (e.g., accessories, lot numbers, configuration, etc.).

In Block 606, process 600 includes determining an indication of free locking the micromobility transit vehicle. The indication of free locking may be based on the comparing. For example, if the sensed roll angle is equal to or approximate to the threshold roll angle within a threshold amount, the micromobility transit vehicle may be determined to be free locked or otherwise in a free lock condition. Similarly, if the sensed vibration data is identical or similar to the threshold frequency spectrum within a threshold amount, the micromobility transit vehicle may be determined to be free locked or otherwise in a free lock condition. If, however, the sensed roll angle or vibration data is different than the threshold roll angle or threshold frequency spectrum outside a threshold amount, the micromobility transit vehicle may be determined to be properly locked. In some embodiments, the indication of free locking may be determined using the data from the proximity sensor, whether alone or in combination with the sensed roll angle and/or vibration data. For example, a detection of the security device 408 secured to an object may confirm an indication of free locking suggested by the roll angle and/or vibration data.

In Block 608, process 600 includes generating and sending one or more notifications of the indication of free locking. For example, a push notification, an in-app notification, a voice call, an email, or any combination thereof may be generated and sent to provide notification of the indication of free locking (e.g., that the micromobility transit vehicle is free locked). The one or more notifications may be generated and sent for display on a mobile device. The mobile device may be smartphone, tablet, or other mobile computing and/or communication device. The mobile device may be similar to any one of user devices 130, 130*a*, or 130*b*. In some embodiments, the one or more notifications may be generated and sent for display on a user interface, such as a user interface of a micromobility transit vehicle or a mobile device. For example, the one or more notifications may be generated and sent for display on user interface 113 or user interface 132. In this manner, the one or more notifications may be sent to a rider of the micromobility transit vehicle.

Various levels of notifications may be generated and sent based on the number and/or severity of determined indication of free locking. For example, a first notification of a first notification type may be generated and sent upon or after determining a first indication of free locking the micromobility transit vehicle, a second notification of a second notification type may be generated and sent upon or after determining a second indication of free locking the micromobility transit vehicle, and so on. Each of the first notification and the second notification may be generated and sent for display on a mobile device, such as any of user device 130, 130*a*, or 130*b*. In some embodiments, a push notification with a gentle reminder of proper locking procedures may be generated and sent upon or after a first indication of free locking the micromobility transit vehicle. Upon or after a second indication of free locking the micromobility transit vehicle, an email with a stem reminder of proper locking procedures may be generated and sent. Upon or after a third indication of free locking the micromobility transit vehicle, a notification request may be generated and sent requesting or requiring an end-of-ride image be taken to confirm the micromobility transit vehicle is properly locked before the ride is ended. Upon or after a fourth indication of free locking the micromobility transit vehicle, a fine may be generated and sent. The determined free locking of the micromobility transit vehicle may be performed by the same entity, such as by the same rider, user, operator, operating group, fleet manager, etc. In such embodiments, the notifications, requests, or fines may be sent to the operator, operating group, fleet manager, etc. In some embodiments, these enforcement levels may be modified based on different factors, such as the seriousness of the free lock condition and/or the frequency and type of the free lock condition for a particular operator. For example, free locking the micromobility transit vehicle within a high danger zone may elevate the enforcement level for a given free lock violation.

Figure 15:
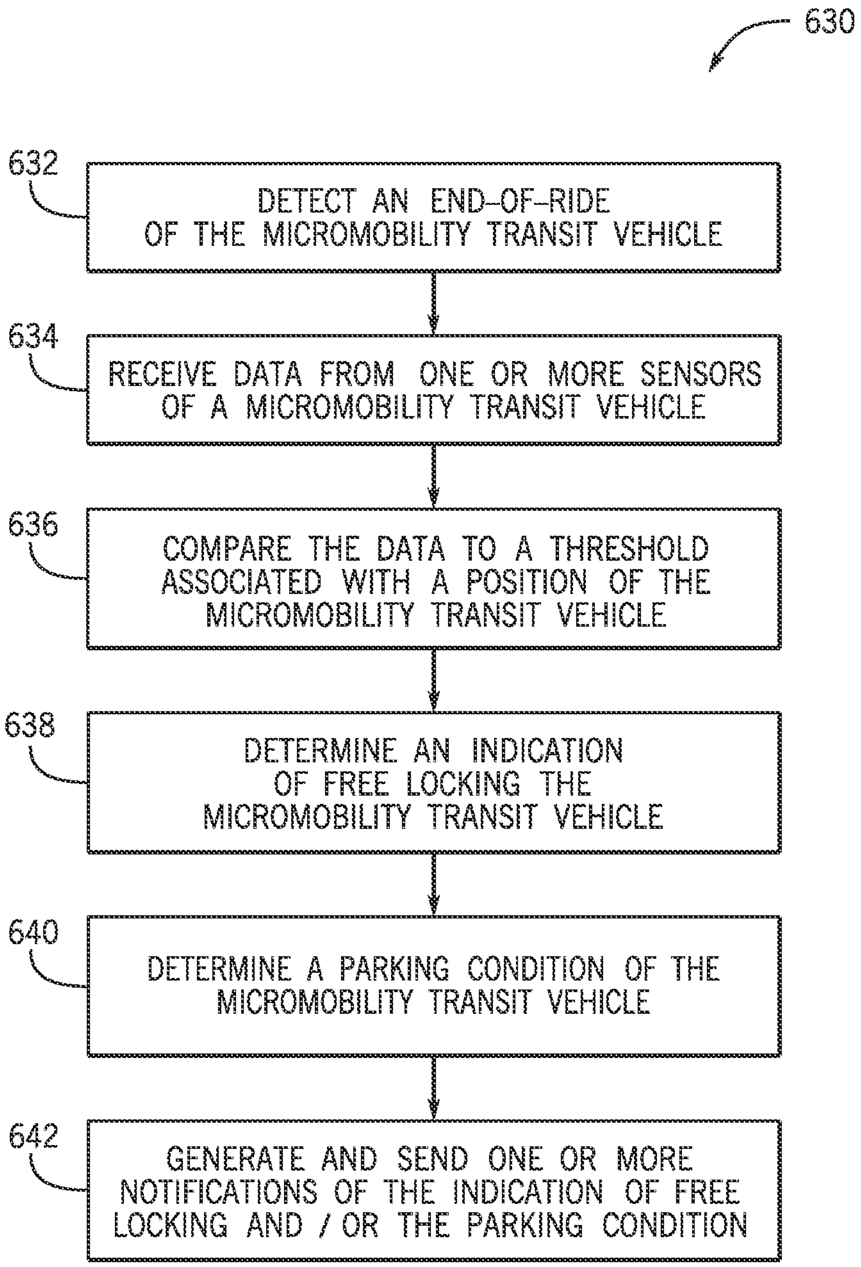
FIG. 15 illustrates a flow diagram of another process of determining a free lock condition of a micromobility transit vehicle in accordance with an embodiment of the disclosure.

FIG. 15 illustrates a flow diagram of another process 630 of determining a free lock condition of a micromobility transit vehicle in accordance with an embodiment of the disclosure. It should be appreciated that any step, sub-step, sub-process, or block of process 630 may be performed in an order or arrangement different from the embodiments illustrated by FIG. 15. For example, one or more blocks may be omitted from or added to the process 630. Although process 630 is described with reference to the embodiments of FIGS. 1-13, process 630 may be applied to other embodiments.

In Block 632, process 630 includes detecting an end-of-ride of the micromobility transit vehicle. For example, an operator of the micromobility transit vehicle may confirm end-of-ride on a system of the micromobility transit vehicle or in an application running on a mobile device, the micromobility transit vehicle may be stationary for a predefined period, or the like.

In Block 634, process 630 includes receiving data from one or more sensors of the micromobility transit vehicle upon or after the detecting of the end-of-ride condition. For example, a roll angle and/or vibration data may be received from an IMU or external accelerometer attached to the micromobility transit vehicle, data may be received from a proximity sensor of the micromobility transit vehicle, and/or image data may be received from a camera associated with the micromobility transit vehicle or with an operator of the micromobility transit vehicle, such as a phone of the operator.

In Block 636, process 630 includes comparing the data to a threshold associated with a position of the micromobility transit vehicle. For example, the roll angle of the micromobility transit vehicle may be compared to a threshold roll angle stored for the micromobility transit vehicle and adjusted based on a ground angle at the micromobility transit vehicle's position. For instance, if the micromobility transit vehicle is leaned uphill, the threshold roll angle may be reduced. Similarly, if the micromobility transit vehicle is leaned downhill, the threshold roll angle may be increased.

In Block 638, process 630 includes determining an indication of free locking the micromobility transit vehicle. The indication of free locking may be based on the comparing. For example, if the sensed roll angle is equal to or approximate to the threshold roll angle, the micromobility transit vehicle may be determined to be free locked or otherwise in a free lock condition. If, however, the sensed roll angle is different than the threshold roll angle, the micromobility transit vehicle may be determined to be properly locked. In some embodiments, the indication of free locking may be determined using the data from the proximity sensor, whether alone or in combination with the sensed roll angle and/or vibration data. For example, a detection of the security device 408 secured to an object may confirm an indication of free locking suggested by the roll angle and/or vibration data.

In Block 640, process 630 may include determining a parking condition of the micromobility transit vehicle. The parking condition may be determined utilizing image data of the micromobility transit vehicle upon or after the detecting of the end-of-ride condition. The image data may be received from an end-of-ride image taken by the operator. Block 640 may include analyzing the image data to determine whether the micromobility transit vehicle is parked within an area with distinct coloring or patterns, within an area outlined with distinct coloring or patterns, or within or near an area identified by an approved parking sign. For example, Block 640 may determine if the micromobility transit vehicle is properly parked in any one of the first detectable virtual station 460, second detectable virtual station 462, third detectable virtual station 464, or fourth detectable virtual station 466 described above.

In some embodiments, Block 640 may include analyzing the image data to determine if an end-of-ride image of the micromobility transit vehicle is valid and complete and includes a complete picture of the micromobility transit vehicle, such as in a manner similar to Blocks 514, 520, and 522 described above. Analyzing the image data may include classifying a parking surface and a contextual location of the parking condition of the micromobility transit vehicle, such as in a manner similar to Blocks 530, 532, 534, and 546-572 described above.

In Block 642, process 630 may include generating and sending one or more notifications of the parking condition, generating and sending one or more notifications of the indication of free locking, or both. For example, a push notification, an in-app notification, a voice call, an email, or any combination thereof may be generated and sent to provide notification of improper parking behavior and/or the indication of free locking the micromobility transit vehicle, such as in a manner described above. For instance, the one or more notifications may be generated and sent for display on a mobile device, such as a smartphone, tablet, or other mobile computing and/or communication device. In some embodiments, the one or more notifications may be generated and sent for display on a user interface, such as a user interface of a micromobility transit vehicle or a mobile device. The mobile device may be similar to any one of user devices 130, 130*a*, or 130*b*. The user interface may be similar to any one of user interface 113 or user interface 132.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method for identifying a parking location of a micromobility transit vehicle, comprising:
- detecting a completion of a ride reservation of a micromobility transit vehicle; and
- in response to detecting the completion of the ride reservation:
  - receiving sensor data from one or more sensors associated with the micromobility transit vehicle;
  - determining, based on the sensor data, whether a location of the micromobility transit vehicle corresponds to at least one of a plurality of detectable virtual stations; and
  - identifying a parking location of the micromobility transit vehicle based on whether the location of the micromobility transit vehicle corresponds to the at least one of the plurality of detectable virtual stations.

2. The method of claim 1, wherein the plurality of detectable virtual stations comprises a first detectable virtual location, a second detectable virtual location, a third detectable virtual location, and a fourth detectable virtual location.

3. The method of claim 2, wherein:
- the first detectable virtual location comprises a parking location including a distinct color, a distinct texture, or a distinct pattern with respect to a surface on which the micromobility transit vehicle is parked;
- the second detectable virtual location comprises a parking location including an outline having a distinct color, a distinct texture, or a distinct pattern;
- the third detectable virtual location comprises a parking location including a predetermined placard; and
- the fourth detectable virtual location comprises a parking location including a sign having one or more predetermined indicia.

4. The method of claim 1, further comprising determining, based on the sensor data, whether the location of the micromobility transit vehicle corresponds to the at least one of the plurality of detectable virtual stations utilizing an object detection algorithm.

5. The method of claim 1, wherein determining whether the location of the micromobility transit vehicle corresponds to the at least one of the plurality of detectable virtual stations comprises determining, based on the sensor data, whether the location of the micromobility transit vehicle is: 1) completely within the at least one of the plurality of detectable virtual stations, 2) partially within the at least one of the plurality of detectable virtual stations, or 3) outside of the at least one of the plurality of detectable virtual stations.

6. The method of claim 1, further comprising:
- prior to receiving the sensor data from the one or more sensors associated with the micromobility transit vehicle, requesting an image of the micromobility transit vehicle or of an area proximate to the micromobility transit vehicle.

7. The method of claim 1, wherein identifying the location of the micromobility transit vehicle comprises identifying the location of the micromobility transit vehicle utilizing one or more classification models.

8. A system for identifying a parking location of a micromobility transit vehicle, comprising:
- one or more non-transitory computer-readable storage media including instructions; and
- one or more processors communicatively coupled to the one or more sensors and the one or more non-transitory computer-readable storage media, the one or more processors configured to execute the instructions to:
  - detect a completion of a ride reservation of a micromobility transit vehicle; and
  - in response to detecting the completion of the ride reservation:
    - receive sensor data from the one or more sensors associated with the micromobility transit vehicle;

determine, based on the sensor data, whether a location of the micromobility transit vehicle corresponds to at least one of a plurality of detectable virtual stations; and identify a parking location of the micromobility transit vehicle based on whether the location of the micromobility transit vehicle corresponds to the at least one of the plurality of detectable virtual stations.

9. The system of claim 8, wherein the plurality of detectable virtual stations comprises a first detectable virtual location, a second detectable virtual location, a third detectable virtual location, and a fourth detectable virtual location.

10. The system of claim 9, wherein:

the first detectable virtual location comprises a parking location including a distinct color, a distinct texture, or a distinct pattern with respect to a surface on which the micromobility transit vehicle is parked;

the second detectable virtual location comprises a parking location including an outline having a distinct color, a distinct texture, or a distinct pattern;

the third detectable virtual location comprises a parking location including a predetermined placard; and the fourth detectable virtual location comprises a parking location including a sign having one or more predetermined indicia.

11. The system of claim 8, wherein the instructions further comprise instructions to determine, based on the sensor data, whether the location of the micromobility transit vehicle corresponds to the at least one of the plurality of detectable virtual stations utilizing an object detection algorithm.

12. The system of claim 8, wherein the instructions to determine whether the location of the micromobility transit vehicle corresponds to the at least one of the plurality of detectable virtual stations further comprise instructions to determine, based on the sensor data, whether the location of the micromobility transit vehicle is: 1) completely within the at least one of the plurality of detectable virtual stations, 2) partially within the at least one of the plurality of detectable virtual stations, or 3) outside of the at least one of the plurality of detectable virtual stations.

13. The system of claim 8, wherein the instructions further comprise instructions to:

prior to receiving the sensor data from the one or more sensors associated with the micromobility transit vehicle, request an image of the micromobility transit vehicle or of an area proximate to the micromobility transit vehicle.

14. The system of claim 8, wherein the instructions to identify the location of the micromobility transit vehicle further comprise instructions to identify the location of the micromobility transit vehicle utilizing one or more classification models.

15. A non-transitory computer-readable medium comprising instructions that, when executed by one or more processors of a computing system, cause the computing system to:

detect a completion of a ride reservation of a micromobility transit vehicle; and in response to detecting the completion of the ride reservation:

receive sensor data from one or more sensors associated with the micromobility transit vehicle;

determine, based on the sensor data, whether a location of the micromobility transit vehicle corresponds to at least one of a plurality of detectable virtual stations; and identify a parking location of the micromobility transit vehicle based on whether the location of the micromobility transit vehicle corresponds to the at least one of the plurality of detectable virtual stations.

16. The non-transitory computer-readable medium of claim 15, wherein the plurality of detectable virtual stations comprises a first detectable virtual location, a second detectable virtual location, a third detectable virtual location, and a fourth detectable virtual location.

17. The non-transitory computer-readable medium of claim 16, wherein:

the first detectable virtual location comprises a parking location including a distinct color, a distinct texture, or a distinct pattern with respect to a surface on which the micromobility transit vehicle is parked;

the second detectable virtual location comprises a parking location including an outline having a distinct color, a distinct texture, or a distinct pattern;

the third detectable virtual location comprises a parking location including a predetermined placard; and the fourth detectable virtual location comprises a parking location including a sign having one or more predetermined indicia.

18. The non-transitory computer-readable medium of claim 15, wherein the instructions further comprise instructions to determine, based on the sensor data, whether the location of the micromobility transit vehicle corresponds to the at least one of the plurality of detectable virtual stations utilizing an object detection algorithm.

19. The non-transitory computer-readable medium of claim 15, wherein the instructions to determine whether the location of the micromobility transit vehicle corresponds to the at least one of the plurality of detectable virtual stations further comprise instructions to determine, based on the sensor data, whether the location of the micromobility transit vehicle is: 1) completely within the at least one of the plurality of detectable virtual stations, 2) partially within the at least one of the plurality of detectable virtual stations, or 3) outside of the at least one of the plurality of detectable virtual stations.

20. The non-transitory computer-readable medium of claim 15, wherein the instructions to identify the location of the micromobility transit vehicle further comprise instructions to identify the location of the micromobility transit vehicle utilizing one or more classification models.

* * * * *